United States Patent
Li

(10) Patent No.: US 10,805,524 B2
(45) Date of Patent: Oct. 13, 2020

(54) IMAGE MODIFICATION BASED ON OBJECTS OF INTEREST

(71) Applicant: eBay Inc., San Jose, CA (US)

(72) Inventor: Dong Charles Li, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/406,920

(22) Filed: May 8, 2019

(65) Prior Publication Data

US 2019/0268534 A1 Aug. 29, 2019

Related U.S. Application Data

(63) Continuation of application No. 15/136,388, filed on Apr. 22, 2016, now Pat. No. 10,432,849.

(51) Int. Cl.
*H04N 5/232* (2006.01)
*H04N 9/64* (2006.01)
*H04N 9/73* (2006.01)

(52) U.S. Cl.
CPC ..... *H04N 5/23222* (2013.01); *H04N 5/23216* (2013.01); *H04N 5/23293* (2013.01); *H04N 9/646* (2013.01); *H04N 9/735* (2013.01); *H04N 5/23296* (2013.01)

(58) Field of Classification Search
CPC ............... H04N 5/23222; H04N 9/646; H04N 5/23293; H04N 9/735; H04N 5/23216; H04N 5/23296
See application file for complete search history.

(56) References Cited

U.S. PATENT DOCUMENTS

| | | | |
|---|---|---|---|
| 7,409,145 B2 | 8/2008 | Antoun et al. | |
| 7,805,066 B2 | 9/2010 | Wexler et al. | |
| 9,473,687 B2 | 10/2016 | Luk et al. | |
| 10,432,849 B2 | 10/2019 | Li | |
| 2003/0067551 A1* | 4/2003 | Venturino | H04N 5/23293 348/364 |
| 2004/0201699 A1 | 10/2004 | Parulski et al. | |
| 2007/0180482 A1 | 8/2007 | Frink et al. | |
| 2007/0206108 A1* | 9/2007 | Nozawa | H04N 1/6086 348/333.01 |
| 2009/0061971 A1 | 3/2009 | Weitzner et al. | |
| 2012/0069212 A1 | 3/2012 | Imai | |

(Continued)

OTHER PUBLICATIONS

Corrected Notice of Allowability received for U.S. Appl. No. 15/136,388, dated Aug. 27, 2019, 4 pages.

(Continued)

*Primary Examiner* — Mekonnen D Dagnew
(74) *Attorney, Agent, or Firm* — Mintz Levin Cohn Ferris Glovsky and Popeo, P.C.

(57) ABSTRACT

In various example embodiments, a system and method for modifying images are presented. The system receives a user interface selection initiating an image capture and detects a first image capture parameter. The system identifies an object of interest within a field of view of an image capture device and identifies a set of object characteristics of the object of interest. The system generates a parameter notification indicating a suggested modification of the first image capture parameter based on one or more object characteristics of the set of object characteristics. The system causes presentation of the parameter notification at the image capture device.

20 Claims, 15 Drawing Sheets

(56) References Cited

U.S. PATENT DOCUMENTS

| | | | |
|---|---|---|---|
| 2012/0113307 A1 | 5/2012 | Watanabe et al. | |
| 2014/0285428 A1 | 9/2014 | Holz | |
| 2015/0085145 A1* | 3/2015 | Sinha | H04N 5/23222 348/207.1 |
| 2015/0130981 A1 | 5/2015 | Hagiwara | |
| 2015/0262011 A1 | 9/2015 | Keat et al. | |
| 2015/0264273 A1 | 9/2015 | Feder et al. | |
| 2015/0339905 A1* | 11/2015 | Stevens | G08B 21/02 340/4.1 |
| 2015/0358549 A1 | 12/2015 | Cho et al. | |
| 2015/0373257 A1* | 12/2015 | Shirakawa | H04N 5/23216 348/333.12 |
| 2016/0182816 A1 | 6/2016 | Luk et al. | |
| 2017/0310884 A1 | 10/2017 | Li | |

OTHER PUBLICATIONS

Applicant—Initiated Interview Summary received for U.S. Appl. No. 15/136,388, dated Jul. 28, 2017, 3 pages.

First Action Interview Office Action Summary received for U.S. Appl. No. 15/136,388, dated May 2, 2018, 8 pages.

First Action Pre-Interview Summary received for U.S. Appl. No. 15/136,388, dated Apr. 21, 2017, 6 pages.

First OA Interview Summary received for U.S. Appl. No. 15/136,388 dated Aug. 21, 2017, 7 pages.

Notice of Allowance received for U.S. Appl. No. 15/136,388, dated Jan. 14, 2019, 7 pages.

Notice of Allowance received for U.S. Appl. No. 15/136,388, dated May 3, 2019, 7 pages.

Response to First Action Interview Office Action Summary filed on Dec. 21, 2017, for U.S. Appl. No. 15/136,388, dated Aug. 21, 2017, 13 pages.

Response to First Action Interview Office Action Summary filed on Aug. 31, 2018, for U.S. Appl. No. 15/136,388, dated May 2, 2018, 16 pages.

Aguilar, "Gadget Hacks", Retrieved from the Internet URL: <https://galaxy-note-3.gadgethacks.com/how-to/get-lenovos-exclusive-super-camera-apps-your-galaxy-note-3-0150388/>, Jan. 21, 2014, 9 pages.

U.S. Appl. No. 15/136,388, filed Apr. 22, 2016, Image Modification Based on Objects of Interest.

* cited by examiner

IMAGE MODIFICATION BASED ON OBJECTS OF INTEREST

CROSS-REFERENCE TO RELATED APPLICATION

This application is a continuation of U.S. patent application Ser. No. 15/136,388, filed Apr. 22, 2016, which is incorporated by reference herein in its entirety.

TECHNICAL FIELD

Embodiments of the present disclosure relate generally to image capture and, more particularly, but not by way of limitation, to modifying images and image capture parameters for accurate portrayal of an image subject.

BACKGROUND

Conventionally, image capture devices provide image capture modes and image effects to provide artistic changes to an image captured by the image capture device. The artistic changes are often made to exaggerate portions of the image and reduce accuracy. Image capture modes are often provided to a user prior to capture of an image such that the image capture device is placed into an image capture mode with specified settings prior to capture of the image. Image capture modes are often independent of context or rely on a user to correctly select the image capture mode appropriate for a context or subject of the image. Image effects are often provided after capture of the image. Image effects are often provided regardless of context of the image.

BRIEF DESCRIPTION OF THE DRAWINGS

Various ones of the appended drawings merely illustrate example embodiments of the present disclosure and cannot be considered as limiting its scope.

Figure 1:
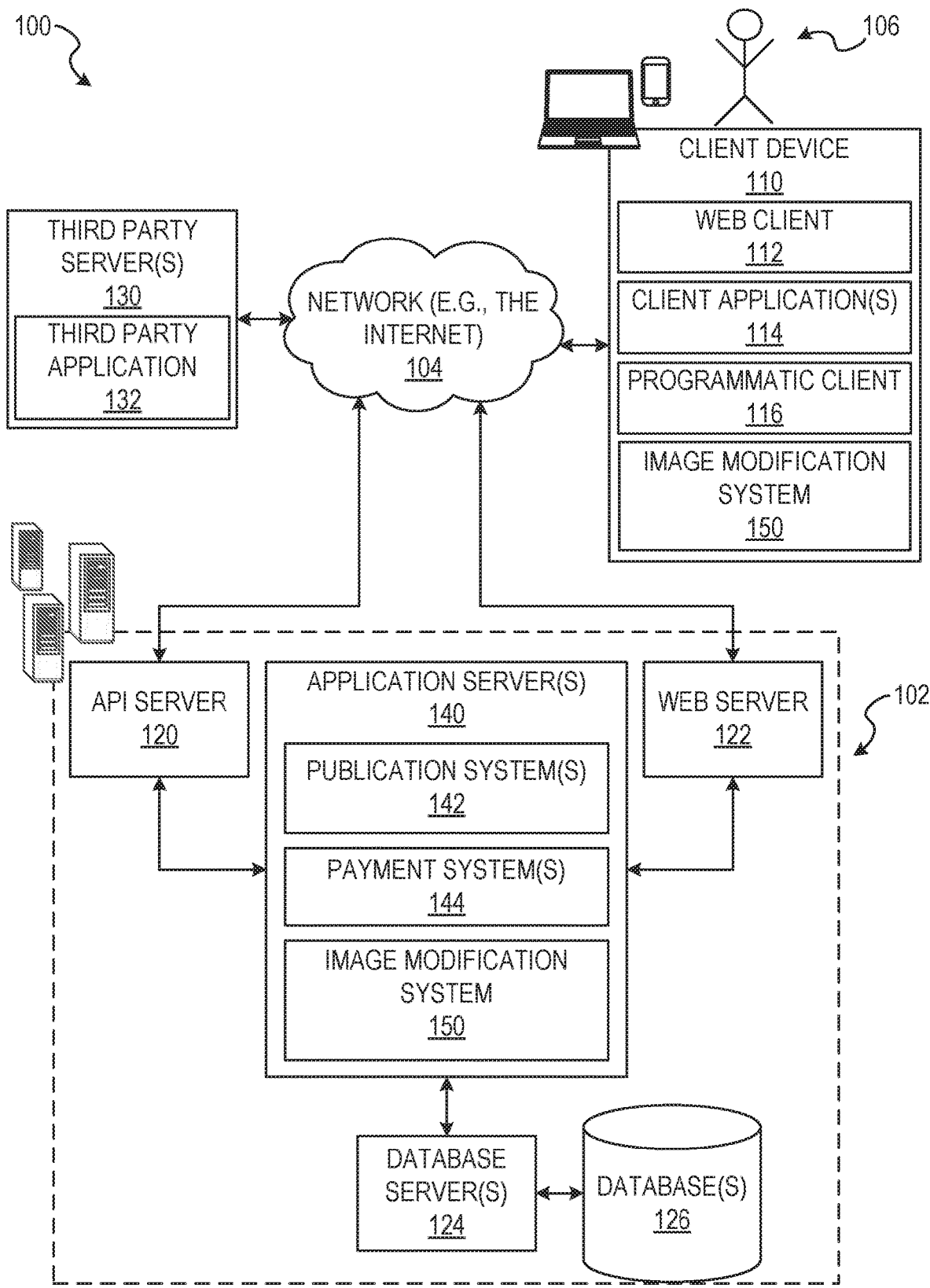
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems for an image modification are presented. Users capturing images for publication are often not skilled photographers. Captured images in amateur or hobbyist publications may not appear as clear or accurate as those professionally photographed and provided in large scale or professional publications. For example, an image captured by an amateur or hobbyist may not offer sharp focus, accurate contrast, and accurate white balance. Imbalances in image capture characteristics such as focus, contrast, white balance, color saturation, and other characteristics may lower interest in a publication, reduce user interaction with the publication, and lead to dissatisfaction with an item underlying the publication.

Embodiments of the present disclosure describe systems and methods for an image capture and modification system to enable users to capture quality and accurate images. The image capture and modification system may dynamically change or suggest changes to image capture modes, image capture parameters, and image composition elements to ensure accurate and sharp representation of objects depicted within a captured image.

In some embodiments, the image capture and modification system determines image capture modes, image capture parameters, and image composition elements based on objects detected within a field of view of an image capture device. For example, the image capture and modification system may determine one or more objects within a field of view, determine colors of the objects, and determine relative contrasts among the colors. The image capture and modification system may then automatically adjust an image capture mode and image capture parameters (e.g., white balance, color saturation, international Standards Organization (ISO) speeds, and focus points or values). The image capture and modification system may also generate and present suggestions for changes in a composition of the objects within the field of view. For example, the image capture and modification system may generate and present instructions suggesting a change of a color or type of a background positioned behind an object of interest within the field of view. In some instances, suggestions generated and presented by the image capture and modification system may include suggested manual changes to image capture modes or image capture parameters of the image capture device.

In some embodiments, the image capture and modification system may dynamically change or suggest changes to image capture modes, image capture parameters, and image composition elements based on network-accessible publications including images depicting objects of interest similar to those within the field of view of the image capture device. To ensure accurate and sharp representation of objects depicted within a captured image, the image capture and modification system may perform object detection methods to determine a type, class, or specific object within the field of view of the image capture device. Upon determining information about the object, the image capture and modification system may perform a search on one or more databases or systems via a network to identify publications including images of objects similar to that present within the field of view. From the images depicting similar objects, the image capture and modification system may identify image capture modes, image capture parameters, or image composition values or characteristics of the images depicting similar objects. The image capture and modification system may then dynamically modify or generate and present suggestions for modifications to the image capture mode, the image capture parameters, or the image composition of the image capture device prior to capture of the image. The publications containing images depicting similar objects may be example images on a product or manufacturer web page, images for particular products on an auction or other commerce website, an instructional website such as a school website or a website for a photography course, or any other suitable publications.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, a programmatic client 116, and an image modification system 150 executing on the client device 110. In some embodiments, the image modification system 150 may be entirely included in the client device 110. In some instances, a portion of the image modification system 150 resides at the client device 110 and a portion of the image modification system 150 resides on a publication system 142.

The client device 110 may comprise, but is not limited to, a mobile phone, a desktop computer, a laptop, a portable digital assistant (PDA), a smartphone, a tablet, an ultra book, a netbook, a laptop, a multi-processor system, microprocessor-based or programmable consumer electronics, a game console, a set-top box, or any other communication device that a user may utilize to access the networked system 102. In some embodiments, the client device 110 may comprise a display component (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with the client device 110. In some embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 may include one or more applications 114 (also referred to as "apps") such as, but not limited to, a web browser, a messaging application, an electronic mail (email) application, an e-commerce site application (also referred to as a marketplace application), and the like. In some embodiments, if the e-commerce site application is included in a given one of the client devices 110, then this application 114 is configured to locally provide the user interface and at least some of the functionalities of an e-commerce site, with the application 114 configured to communicate with the networked system 102, on an as-needed basis, for data and/or processing capabilities not locally available (e.g., to access a database of items available for sale, to authenticate a user 106, to verify a method of payment, etc. Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture TOO, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more components or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by a third party. The third party website, for example, provides one or more promotional, marketplace, or payment functions that are supported by the relevant applications of the networked system 102.

The one or more publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment system 144 may form part of the publication system 142.

The image modification system 150 may provide functionality operable to perform various modifications to image capture modes and image parameters. The image modification system 150 may provide functionality operable to generate and present suggested instructions to guide manipulation of image capture publications, image parameters, and image composition. In some embodiments, the modifications performed by the image modification system 150 may be based on aspects of objects and backgrounds within a field of view of an image capture device, image characteristics of images depicting similar objects and published on the one or more publication systems 142, or any other suitable information. For example, the image modification system 150 accesses publications and identifies images, image characteristics image metadata), and descriptions within the publications. In some instances, portions of the image modification system 150 which identify images within publications on the one or more publication systems 142 may be stored at and part of the publication systems 142. In some example embodiments, as referenced above and described in more detail below, the image modification system 150 may reside entirely on the client device 110. In these embodiments, the client device 110 may query the one or more publication systems 142 or query an internal data structure to identify the publications and the images within the publications. The image modification system 150 may modify image parameters or image capture modes and generate and present suggestions for changes to image composition based on information gleaned from the publications. In some example embodiments, the image modification system 150 analyzes objects of interest, backgrounds, image capture parameters, and ambient characteristics to determine and perform modifications to one or more of an image capture mode and an image capture parameter. The image modification system 150 may also generate and cause presentation of suggestions and instructions for modification to image composition within the field of view of the image capture device based on the object of interest, backgrounds, and ambient characteristics.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and image modification system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an offline manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by a third party. The third party website may, for example, provide one or more promotional, marketplace, or payment functions that are supported by the relevant applications of the networked system 102.

Figure 2:
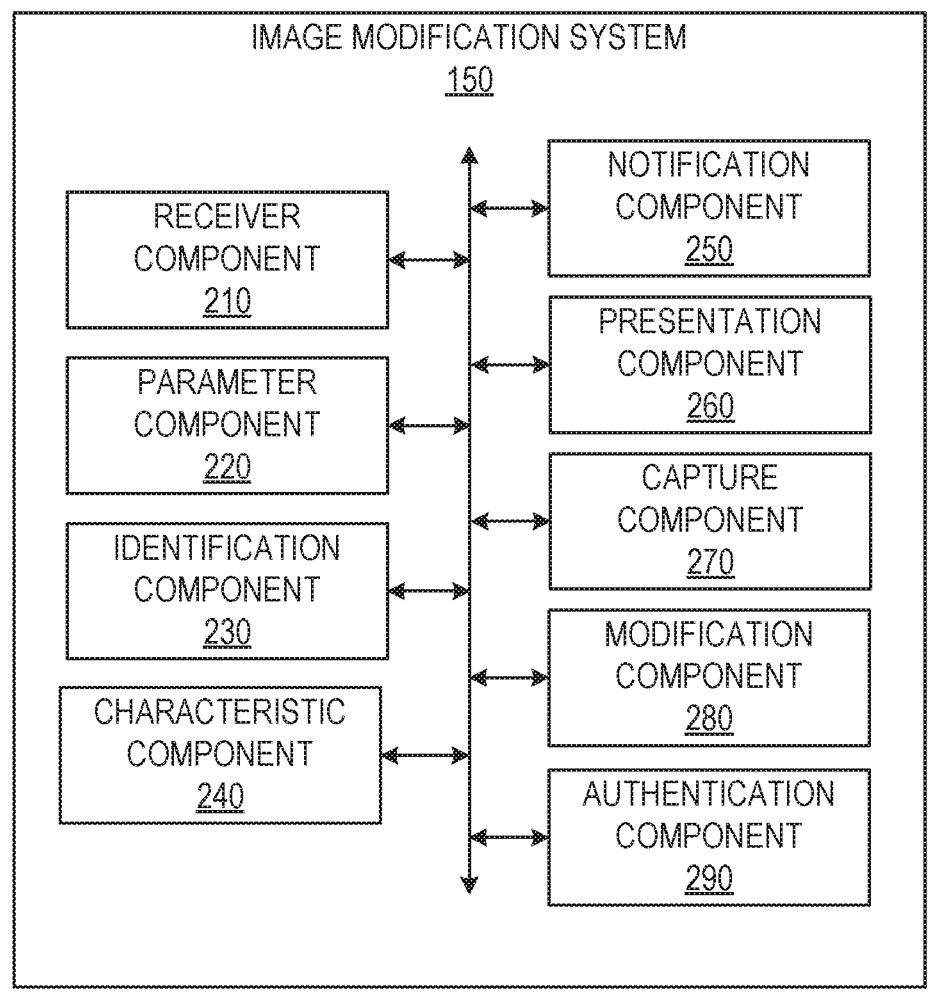
FIG. 2 is a block diagram of an example image modification system, according to various embodiments.

FIG. 2 is a block diagram illustrating components of the image modification system 150, according to some example embodiments. The image modification system 150 is shown as including a receiver component 210, a parameter component 220, an identification component 230, a characteristic component 240, a notification component 250, a presentation component 260, a capture component 270, a modification component 280, and an authentication component 290, all configured to communicate with one another (e.g., via a bus, shared memory, or a switch). Any one or more of the components described herein may be implemented using hardware (e.g., one or more processors of a machine) or a combination of hardware and software. For example, any component described herein may configure a processor (e.g., among one or more processors of a machine) to perform operations for which that component is designed. Moreover, any two or more of these components may be combined into a single component, and the functions described herein for a single component may be subdivided among multiple components. Furthermore, according to various example embodiments, components described herein as being implemented within a single machine, database(s) 126, or device (e.g., client device 110) may be distributed across multiple machines, database(s) 126, or devices.

The receiver component 210 receives a user interface selection (e.g., selection of a user interface element presented at a display device) initiating an image capture operation. The receiver component 210 may access publications within the client device 110 or in the one or more publication systems 142. The receiver component 210 may access publications by direct access to a data structure or non-transitory processor-readable storage medium. The receiver component 210 may also access publications on a remote computing system, server, or database via a network connection.

The parameter component 220 detects image capture parameters for an image capture device associated with the client device 110 and the objects and background within the field of view. The parameter component 220 may detect a setting or parameter of the image capture device, a lens arrangement, a color temperature, a white balance, a contrast setting, a filter setting, a focus setting, a focus element, an image capture mode, or any other suitable parameters of the image capture device. In some embodiments, the parameter component 220 determines parameters of image composition elements for the field of view. For example, the parameter component may determine contrast values between portions of a background and an object of interest within the field of view. The parameter component 220 may also determine that various parameters are below or exceed threshold values.

The identification component 230 identifies objects of interest within the field of view of the image capture device associated with the client device 110. The identification component 230 may identify the objects of interest by parsing identifying information for the object of interest within a publication (e.g., a draft of a publication generated for inclusion in the one or more publication systems 142). In some embodiments, the identification component 230 identifies objects of interest based on characteristics of the object of interest within the field of view of the image capture device associated with the client device 110. The identification component 230 may identify the object of interest using one or more images or object recognition techniques. For example, the identification component 230 may use edge detection, object recognition, rigid point detection, shape recognition, or any other operation or set of operations configured to identify an object or a type or class of object within a field of view or an image.

The characteristic component 240 identifies sets of characteristics for the image modification system 150. In some instances, the characteristic component 240 identifies sets of object characteristics for an object within a field of view of the image capture device associated with the client device 110. The characteristic component 240 may also identify characteristics of the image capture device and values or characteristics of image capture parameters used by the image capture device. In some instances, the set of characteristics includes color values, color temperatures, sizes, dimensions, contrast values, ISO speeds, shutter speeds, focus points, focal length values, pixel dimensions, and other characteristics.

The notification component 250 generates notifications for the image modification system 150. In some embodiments, the notification component 250 generates parameter notifications including suggested changes in parameters. In some instances, where the image modification system 150 dynamically and automatically changes image capture modes, the notification component 250 generates indications or alerts of the changes implemented by the image modification system 150.

The presentation component 260 causes presentation of various aspects of the image modification system 150, including instructions, suggestions, parameter notifications, and modified images. In some embodiments, the presentation component 260 causes presentation of a field of view of an image capture device associated with the client device 110. In some instances, the presentation component 260 causes presentation by transmitting data indicative of the images, notifications, fields of view, suggestions, or instructions to the client device 110. In some instances, the presentation component 260 is implemented within the publication system 142 in the context of a web application, a server based application, or a client-side application 114 (e.g., all or a portion of an application stored on the client device 110).

Figure 3:
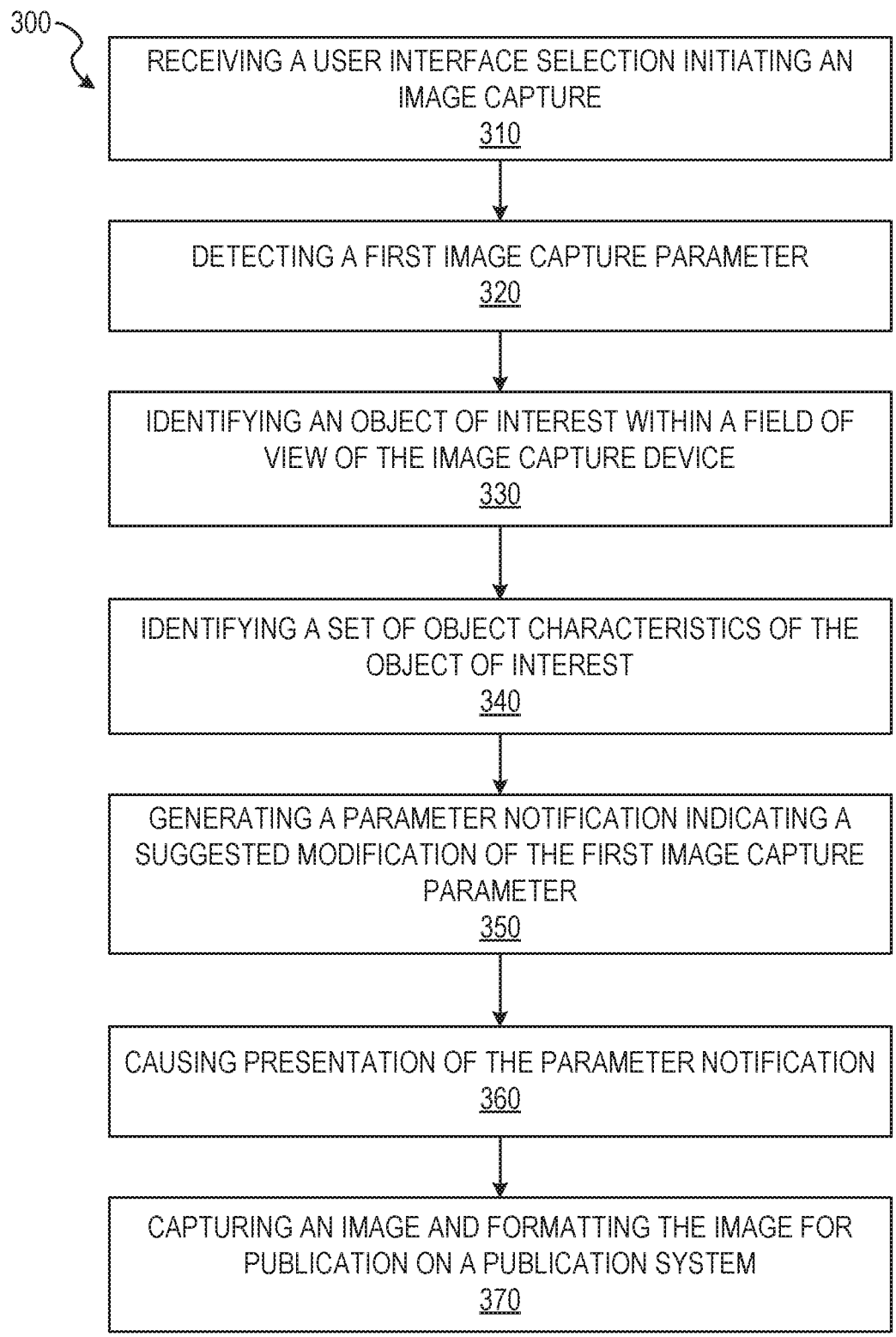
FIG. 3 is a flow chart illustrating an example method, according to various embodiments.

FIG. 3 is a flow chart of operations of the image modification system 150 in performing a method 300 of identifying and generating a set of modified images for a publication on a network-based publication system, according to some example embodiments. Operations in the method 300 may be performed by the image modification system 150, using components described above with respect to FIG. 2.

Figure 4:
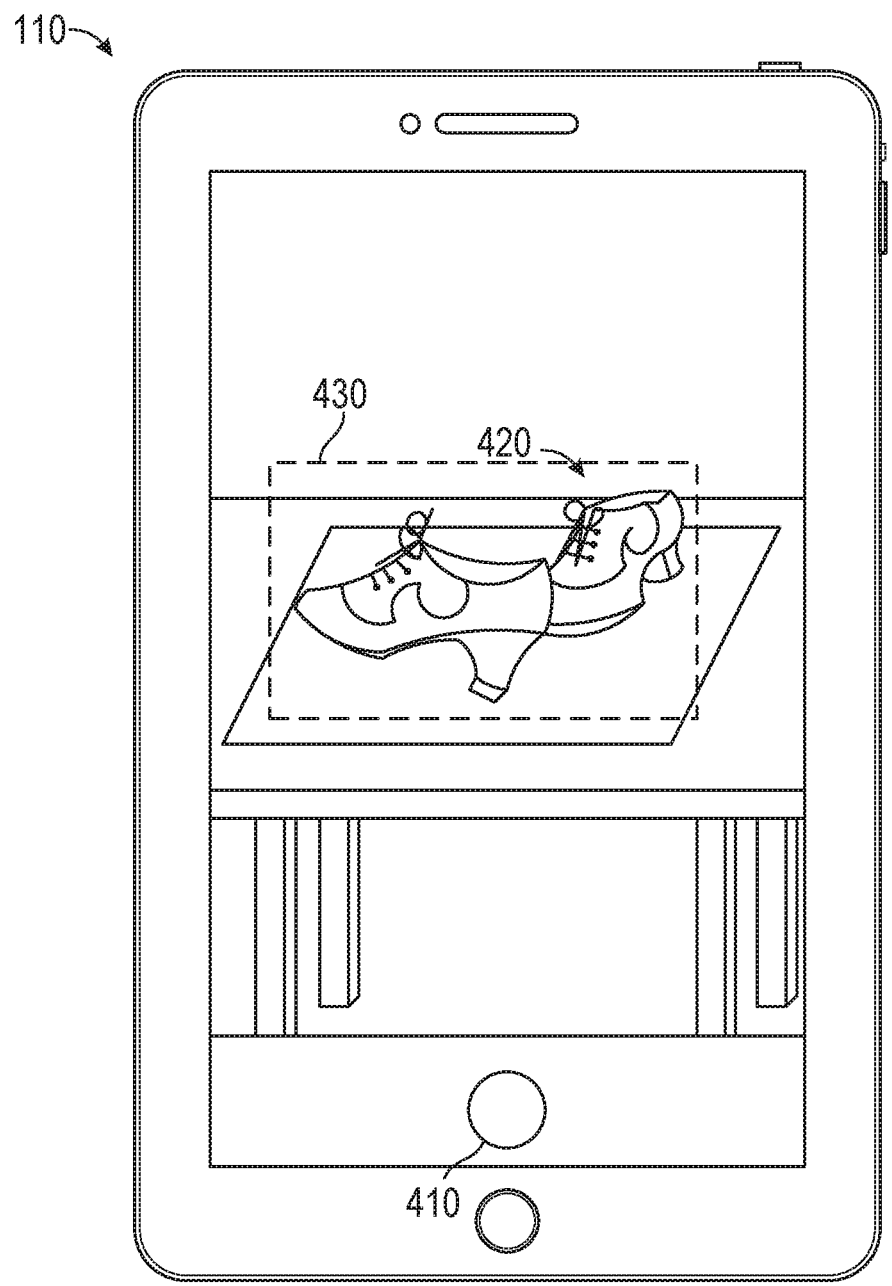
FIG. 4 is an example user interface diagram illustrating a user interface screen including a field of view, according to various embodiments.

In operation 310, the receiver component 210 receives a user interface selection initiating an image capture. As shown in FIG. 4, the user interface selection may represent a user interaction with a user interface element 410. The receiver component 210 may receive the user interface selection from a user interface presented on an image capture device. In some embodiments, the user interface selection may be an interaction with an input device of the image capture device. For example, the user interface selection may be a tap (e.g., a temporary finger contact) on a touch screen, a press of a physical button (e.g., a button, a switch, a toggle, a wheel), a mouse click, or pressing a key on a keyboard (e.g., a physical keyboard or a virtual keyboard) to indicate a command. In some instances, in order to initiate an image capture, in response to the user interface selection, the image capture device opens or otherwise initiates an image capture application. In some embodiments, the user interface selection may be received within a user interface of an application for generating publications for storage and provision by the publication system 142. In these embodiments, the initiation of the image capture may include changing modes within the publication generation application to an image capture mode, temporarily switching from the publication generation application to an image capture application (e.g., performed automatically by the image capture device and reverting back to the publication generation application after capture of an image), or any other suitable manner of initiating a set of image capture operations.

In operation 320, the parameter component 220 detects a first image capture parameter. The parameter component 220 may detect the first image capture parameter as a setting or parameter of the image capture device or a camera or lens arrangement of the image capture device. The first image capture parameter may be an adjustable setting or parameter of the image capture device a parameter adjustable in either hardware or software associated with the image capture device). The first image capture parameter may be a white balance, a color temperature setting, a contrast setting, a color filter setting, a lens effect setting, a focus setting, or a mode (e.g., indoors, sunny day, night, or candlelight) setting indicating a predetermined arrangement of parameter values for the image capture device. Although described with respect to specified parameters or settings, it should be understood that the first image capture parameter may be any parameter which may be modified for the image capture device prior to or during an image capture process.

The first image capture parameter may be detected in response to operation 310. In some instances, the parameter component 220 detects the first image capture parameter by accessing one or more settings of the image capture device, one or more parameter of software associated with the image capture device, one or more parameter of an image sensor associated with the image capture device, one or more parameter of a lens associated with the image capture device, combinations thereof, or any other parameter or setting. The parameter component 220 may detect the first image capture parameter by accessing metadata for hardware (e.g., the lens or the image sensor) associated with the image capture device or metadata for the software associated with the image capture device. In some embodiments, the metadata may be static (e.g., hardware configuration data) associated with the image capture device. In some instances, the metadata is dynamic, generated or otherwise set upon initiation of the operation 310.

In operation 330, the identification component 230 identifies an object of interest within a field of view of the image capture device. As shown in FIG. 4, the object of interest 420 may be identified and highlighted with an interest element 430. The interest element 430 may be a user interface element generated to highlight, point to, encompass, or otherwise indicate the object of interest 420. The identification component 230 may identify the object of interest 420 based on any suitable operations. For example, the identification component 230 may identify the object of interest 420 based on one or more focus operations, one or more object recognition (e.g., pattern matching) operations, one or more edge detection operations, or any other suitable method. By way of further example, in some instances, the identification component 230 may identify an object of interest based on a position of the object of interest within a field of view of the image capture device. In these embodiments, an object positioned proximate to a center of the field of view may be prioritized as the object of interest. In some example embodiments, the identification component 230 may generate an object notification highlighting or outlining an identified object of interest. The object notification may request confirmation of the object of interest based on selection of the object of interest through a user interaction with a graphical user interface causing presentation of the object notification. In some instances, the identification component 230 identifies the object of interest and may receive a user interface selection indicating a change in the object of interest to identify a different object of interest within the field of view.

As referenced above, the identification component 230 may also identify an object of interest based on edge detection of objects or portions of objects within the field of view. The identification component 230 may identify one or more edges within the field of view and perform one or more focus operations to sharpen at least a portion of the one or more edges. Once the edges have been sharpened, the identification component 230 may identify the object of interest based on the object's position within the field of view, completeness of the edges of the object (e.g., edges forming a completed perimeter), contrast between the object and a background, or any other suitable operations. In identifying the object of interest based on contrast, the identification component 230 may select the object of interest based on a comparison of the edges, and one or more colors within the edges, to a background within the field of view. This comparison of the edges and colors to the background may identify the object of interest based on a contrast of the edges and the colors exceeding a predetermined contrast threshold with respect to the background.

In some instances, the presentation component 260 causes presentation of the field of view of the image capture device and enables selection of the object of interest based on a user interface interaction (e.g., clicking on an area of the field of view which contains the object of interest). The identification component 230 may identify a preliminary object of interest and the notification component 250 may generate a user interface element to highlight, delimit, encompass, or point to the preliminary object of interest. The selection of the object of interest within the field of view, by a user interaction with a user interface, may cause confirmation of the preliminary object of interest or change a designation of the object of interest to another portion of the field of view.

In operation 340, the characteristic component 240 identifies a set of object characteristics of the object of interest. In some embodiments, the set of object characteristics includes a color value (e.g., a set of color values, a single color value, or an average color value), a color temperature, a size, a set of dimensions, and a contrast value between the object of interest (e.g., at least a portion of the object of interest) and a background positioned behind or surrounding the object of interest. The characteristic component 240 may identify the set of object characteristics by extracting or retrieving values present in the field of view of the image capture device. For example, the characteristic component 240 may identify color values and color temperatures based on color values or color temperature values for pixels identified within the object of interest. The contrast value may be identified by the characteristic component 240 based on comparison of the color values of one or more pixels representing the object of interest with color values of one or more pixels representing the background. In some embodiments, the characteristic component 240 may determine estimated dimensions or the size of the object of interest based on pixel measurements extending between pixels identified as representing at least a portion of the object of interest in order to define boundaries of the object of interest to identify contrast values between the object of interest and the background.

In operation 350, the notification component 250 generates a parameter notification indicating a suggested modification of the first image capture parameter. The notification component 250 may generate the parameter notification based on the set of object characteristics of the object of interest and the first image capture parameter. In some example embodiments, to generate the parameter notifications, the notification component 250 determines a number and type of potential notifications based on the object characteristics included in the set of object characteristics and one or more parameter values included in the first image capture parameter. For example, based on the set of object characteristics and the first image capture parameter, the notification component 250 may identify a contrast value between the object of interest and the background, a size or dimension of the object of interest, a white balance for the image capture device, and a focus value for the image capture device as types of parameters for a potential notification. Each of the object characteristics and the first image capture parameter may correspond to a potential notification. In response to identifying the number and type of potential notifications, the notification component 250 identifies values associated with each of the object characteristics and the first image parameter and determines whether the value is suitable for the image. Where the value is unsuitable for an image, the notification component 250 generates a parameter notification for that object characteristic or the image parameter. For example, where a portion of the object of interest extends outside the field of view, the notification component 250 may identify the dimensions of the object of interest as exceeding the field of view and select a parameter notification for the object characteristic (e.g., the dimension of the object of interest). By way of a further example, where the object characteristic is a contrast value between the object of interest and the background and the image capture parameter is a white balance, the notification component 250 identifies whether the contrast value with within an acceptable range (e.g., exceeds a predetermined threshold contrast) and generates a parameter notification for adjustment of the white balance to cause a change in the contrast value, modifying the contrast value to be within the acceptable range or below a predetermined threshold.

Figure 5:
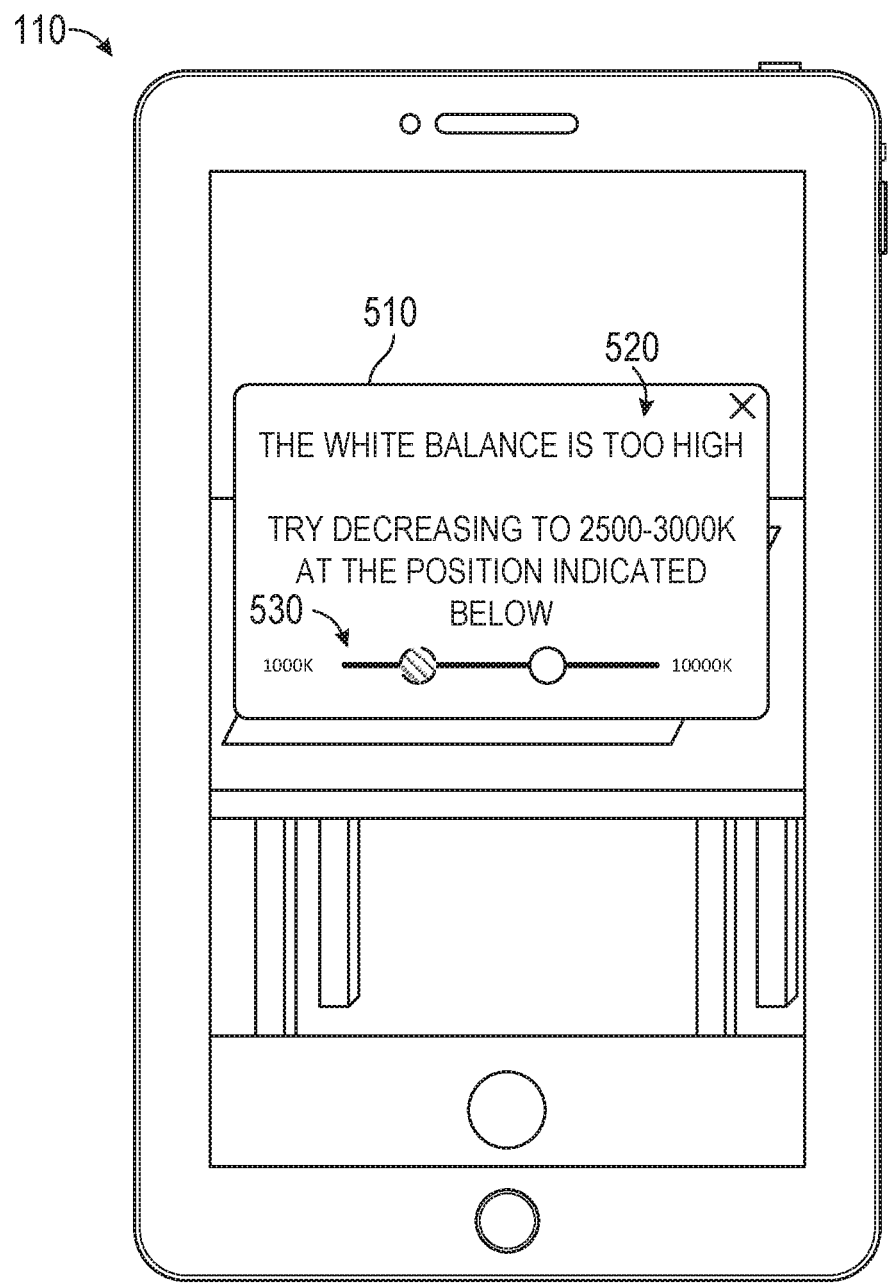
FIG. 5 is an example user interface diagram illustrating a user interface screen including a parameter notification, according to various embodiments.

As shown in FIG. 5, the parameter notification 510 may include instructions 520 and a user interface element 530 for executing the instructions 520. The modification of the first image capture parameter may cause one or more of the set of object characteristics to change within an image captured by the image capture device. The parameter notification 510 may include one or more user interface elements selectable to modify the first image capture parameter. In some embodiments, the notification component 250 generates the parameter notification 510 as indicating a suggested change in a white balance of the image capture device. The notification component 250 may indicate the suggested change by inserting a white balance value in the parameter notification 510 and generating the parameter notification 510 as a pop-up or overlay window to be displayed over a presentation of the field of view of the image capture device.

In some instances, the notification component 250 indicates the suggested change by inserting the white balance value and generating the user interface element 530. The user interface element 530 may be a white balance adjustment element. In these embodiments, the white balance adjustment element may be a text entry field, a slider, a wheel, or another suitable data entry element. The white balance adjustment element may be initially set to a current white balance. In some instances, the suggested white balance value may be generated and included in the parameter notification 510 as a position on the white balance adjustment element (e.g., a tick mark for a position on the slider or the wheel).

The notification component 250 may generate the parameter notification 510 in response to receiving one or more values associated with the set of object characteristics from the characteristic component 240. In these embodiments, one or more of the characteristic component 240 and the notification component 250 may determine that an object characteristic value of the set of object characteristics is below a predetermined characteristic threshold or is unexpected or incorrect. The object characteristic value may be associated with and affected by the first image capture parameter. For example, as described above, the object characteristic may be a color of the object of interest and the first image capture parameter may be a current white balance of the image capture device. Based on the object of interest and one or more objects, colors, or color temperatures within the field of view of the image capture device, the characteristic component 240 may determine that the white balance is below a predetermined white balance value (e.g., the predetermined characteristic threshold) configured to accurately depict colors (e.g., object characteristics) within the field of view in a captured image. For example, one or more of the contrast, the color, or the color temperatures may have a value different than an expected value, based on an existing publication, image, or product. The characteristic component 240 may determine a change in white balance value resulting in a modification of the contrast, color, or color temperature to match the expected value. Where the white balance value is below the predetermined white balance value, the characteristic component 240 may pass to the notification component 250 the predetermined white balance value, an indication of a corrected white balance value (e.g., a white balance value to accurately depict the colors in a captured image), or an amount of white balance value adjustment (e.g., an amount by which the white balance value should be increased or decreased). In some instances, the notification component 250 may be passed values for each of the object characteristics of the set of object characteristics and determine whether any of the object characteristics fall below specified or determined thresholds; warranting a change and generation of a notification.

In operation 360, the presentation component 260 causes presentation of the parameter notification. As shown in FIG. 5, the parameter notification 510 may be presented within the depiction of the field of view of the image capture device. The parameter notification 510 may be presented as an overlay; in a distinct portion of the field of view, such that the parameter notification 510 does not obstruct the object of interest; in a window; or in any other suitable manner. The presentation component 260 may cause presentation by rendering the parameter notification 510 on an output device associated with the image capture device. In some instances, the presentation component 260 may cause presentation by transmitting data indicative of the parameter notification 510 to an output device which is connected to the image capture device by a wired or wireless connection. The data may be transmitted via wired or wireless network (e.g., the network 104).

Figure 6:
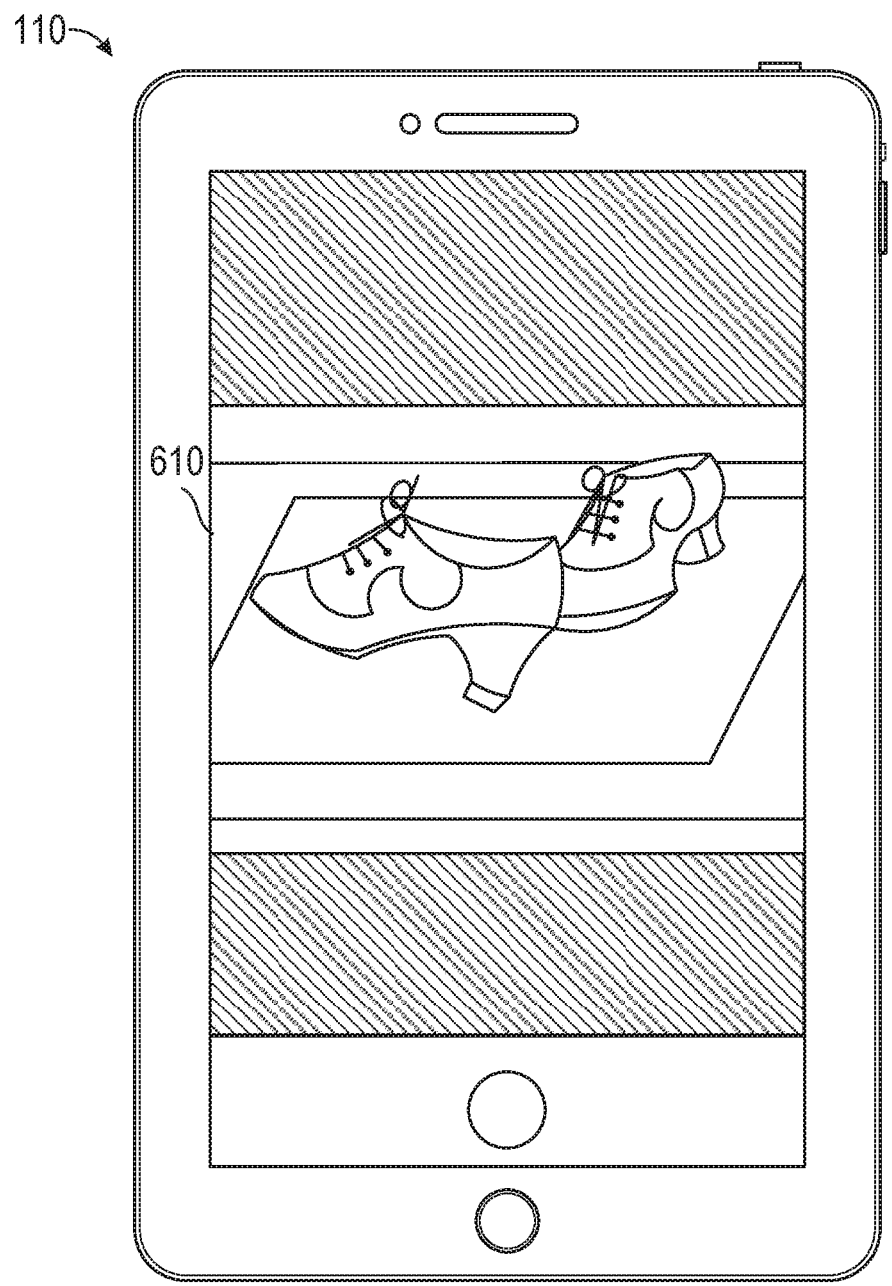
FIG. 6 is an example user interface diagram illustrating a modified image, according to various embodiments.

In operation 370, the image modification system 150 captures an image and formats the image for publication on the publication system 142. As shown in FIG. 6, the image 610 may be formatted and presented within the field of view as modified by the image modification system 150. The image modification system 150 may capture the image based on receiving a change in one or more parameter values. For example, after receiving the change in the first image capture parameter via the white balance adjustment element, the image modification system 150 may enable selection of an image capture element. The selection may be enabled by activating a user interface element, such as by rendering the user interface element, enabling selection (e.g., removing an overlay or a grayed out status) of the user interface element, or any other suitable user interface enablement operations. Upon receiving selection of the image capture element, the image capture device may capture the image of the object of interest within the field of view.

In some embodiments, the operation 370 may be performed by the capture component 270 using a series of sub-operations. The capture component 270 may receive a capture selection indicating interaction with the image capture element to cause capture of an image by the image capture device. For example, the capture component 270 may receive a click of a camera button on the user interface.

The identification component 230 may determine dimensions of the captured image. After the image is captured, the identification component 230 may determine the dimension of the captured image as the total pixel count of the image (e.g., eight megapixels (MP)), the pixel height and width (e.g., 3264 pixels by 2448 pixels), the translated height and width in physical units of measurement (e.g., inches or centimeters), or any other suitable dimensions. The identification component 230 may determine the dimensions based on metadata associated with the captured image, image data from the captured image, or characteristics of a file into which the captured image has been stored.

In response to determining the dimensions of the captured image, the identification component 230 may determine whether the dimensions of the captured image exceeds a predetermined dimension threshold. The predetermined dimension threshold may be a predetermined length and a predetermined width for images, a diagonal measurement for an image, a predetermined pixel count, or any other suitable dimension for an image. Where the predetermined dimension threshold is exceeded, the modification component 280 may modify the dimensions of the captured image to be within the predetermined dimension threshold and generate a modified image. The modification component 280 may modify dimensions of the captured image while maintaining an aspect ratio for the captured image. In some embodiments, the publication system 142 or an application (e.g., website or smartphone application) associated with the publication system 142 may include a threshold for dimensions of images included in a publication stored within the publication system 142. For example, the threshold may be a three MP threshold indicating that images in a specified publication may be displayed in the application when sized below three MP. The modification component 280 may reduce the dimensions of the captured image to meet or fall below the predetermined dimension threshold. The modification component 280 may perform any suitable image reduction technique to reduce the dimensions of the captured image. In some instances, the modification component 280 may select from a set of image reduction techniques to prioritize image reduction having the least reduction in image quality, accuracy, or color representation of the available image reduction techniques.

Figure 7:
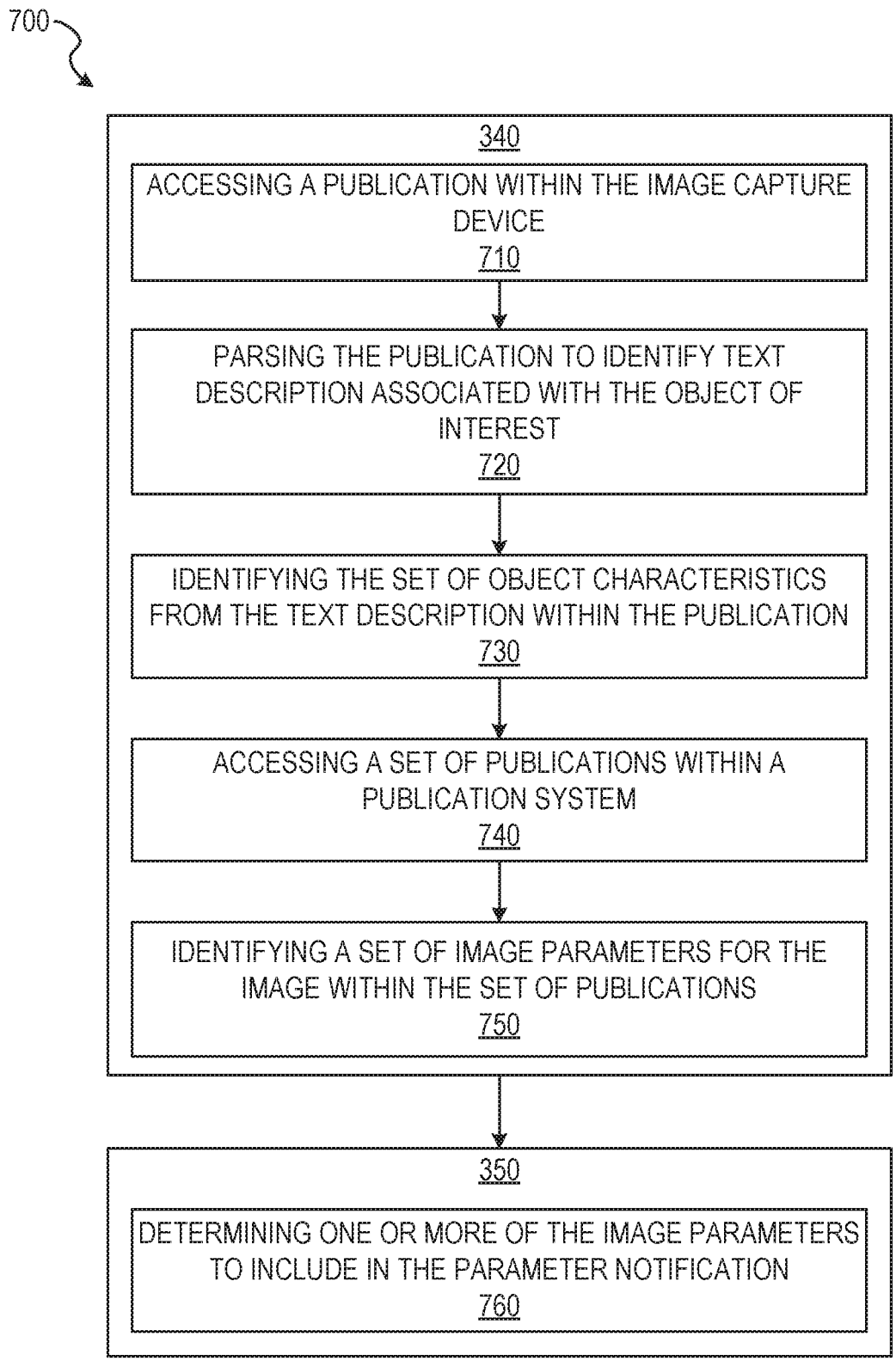
FIG. 7 is a flow chart illustrating an example method, according to various embodiments.

FIG. 7 is a flow chart of operations of a method 700 of the image modification system 150 in performing the operations 340 and 350 for modifying image capture device settings to generate accurate images, according to various example embodiments of the present disclosure. The method 700, depicted in FIG. 7, may be performed by the image modification system 150 using components described above with respect to FIG. 2.

In operation 710, the receiver component 210 accesses a publication within the image capture device. The receiver component 210 may access the publication in the image capture device based on an association with the object of interest. The association between the publication and the object of interest may be determined from the image or may be determined based on user interaction with the image capture device.

Where the association between the publication and the object of interest is determined from the image, the identification component 230 may identify the set of object characteristics, as described above. The set of object characteristics may include identifying information. For example, the set of object characteristics identified by the identification component 230 may include a name, a description, a serial number, or other identifying information visible on the surface of the object of interest. The identification component 230 may parse the identifying information from the field of view of the image capture device using text recognition operations. Once identifying information has been determined by the identification component 230, the receiver component 210 may receive the identifying information and access the publication based on a match between one or more portions of the identifying information and a publication or portion of a publication stored on the image capture device. In some embodiments, the receiver component 210 may attempt to match publications which are listed as pending, incomplete, or in a draft state.

Where the association between the publication and the object of interest is indicated based on user interaction with the image capture device, the image capture device may initially be set in a publication generation mode. In the publication generation mode, a publication may be opened in an editable format. Data may be entered into the publication to generate or modify the publication. The publication generation mode may be provided with an image capture element. The image capture element may be a selectable user interface element that, when selected, causes the image capture device to access the image modification system 1:50, In these embodiments, the receiver component 210 may access the publication in order to retrieve identifying or descriptive information.

In operation 720, the identification component 230 parses the publication to identify text description associated with the object of interest. Once the text description is accessed, the identification component 230 accesses or extracts identifying and descriptive information from the publication. The identification component 230 may use predetermined keywords or values to parse the publication for description information. For example, the identification component 230 may identify text within portions of the publication which have predetermined titles or metadata tags. In these instances, the identification component 230 may parse the publication for section titles (e.g., title, description, size, color, or item specifics). The identification component 230 may also parse the publication for predetermined keywords of a set of descriptive or identifying keywords. For example, the identification component 230 may be provided with a list of colors, dimensions, textures, item types (e.g., car, shirt, or smartphone) and parse the description for words matching the predetermined keywords or semantically related thereto.

In operation 730, the identification component 230 identifies the set of object characteristics from the text description within the publication. The identification component 230 may extract color information, dimension information, item type information, and information capable of identifying the object of interest (e.g., serial numbers, titles, or manufacturers). The identification component 230 may incorporate the extracted data into the set of object characteristics for use in the method 300 described above.

In operation 740, the receiver component 210 accesses a set of publications within the publication system 142. The receiver component 210 may access portions of the descriptive information to access the set of publications of the publication system 142 to identify publications representing items or objects similar to the object being described in the publication being generated. The operation 740 may be performed prior to or after an image has been captured. In some embodiments, the operation 740 may be performed while the image capture device is in the publication generation mode. In these embodiments, the operation 740 may be performed in response to a publication being generated and provided with descriptive information.

In operation 750, the identification component 230 identifies a set of image parameters for images within the set of publications. The identification component 230 may parse the set of publications within the publication system 142 to identify images within the set of publications. The identification component 230 may then identify image parameters associated with the images of the set of publications. The set of image parameters may be identified from metadata associated with the set of publications, image metadata associated with the images, or description data stored within the set of publications. The set of image parameters may include image dimensions, contrast values, color values, white balance values, a color temperature value, or any other suitable parameters used by an image capture device in capturing or processing an image.

In operation 760, the notification component 250 determines one or more of the image parameters to include in the parameter notification. The notification component 250 may determine the one or more image parameters to include based on the set of image parameters or based on the publications. Where the notification component 250 determines the one or more image parameters for inclusion based on the image parameters, the notification component 250, alone or in conjunction with one or more other components described herein, may determine an accuracy value for the image parameters associated with each of the publications of the set of publications. The notification component 250 may include the one or more image parameters determined to have the highest accuracy value. Determination of accuracy values will be described in more detail below with respect to FIG. 13.

Where the notification component 250 determines the one or more image parameters for inclusion based on the publications of the set of publications, the notification component 250 may determine one or more favorability characteristics of the set of publications. In some embodiments, the favorability characteristics include one or more of a number of page views for the publication, a frequency of views for a specified period of time, a set of ratings for the publication, or other characteristics. In some instances, where the publication is an item listing being offered for sale on a website, the favorability characteristics may also include a sale price of the item, a number of watchers (e.g., users saving the publication into a watch list for later viewing), a number of bids, a number of sales where the publication represents a plurality of items, a feedback score, or any other suitable characteristic. The notification component 250 may include the one or more image parameters of the publication having the highest number of favorability characteristics, a higher favorability score generated from the favorability characteristics, or an indication of the highest accuracy for the images included within the publication. For example, the notification component 250 may determine a number of comments or ratings for the publication or the user associated with the publication relating to the accuracy of the images (e.g., the item being as pictured or described). The notification component 250 may then use the publication which has the greatest number of comments or ratings related to accuracy.

Figure 8:
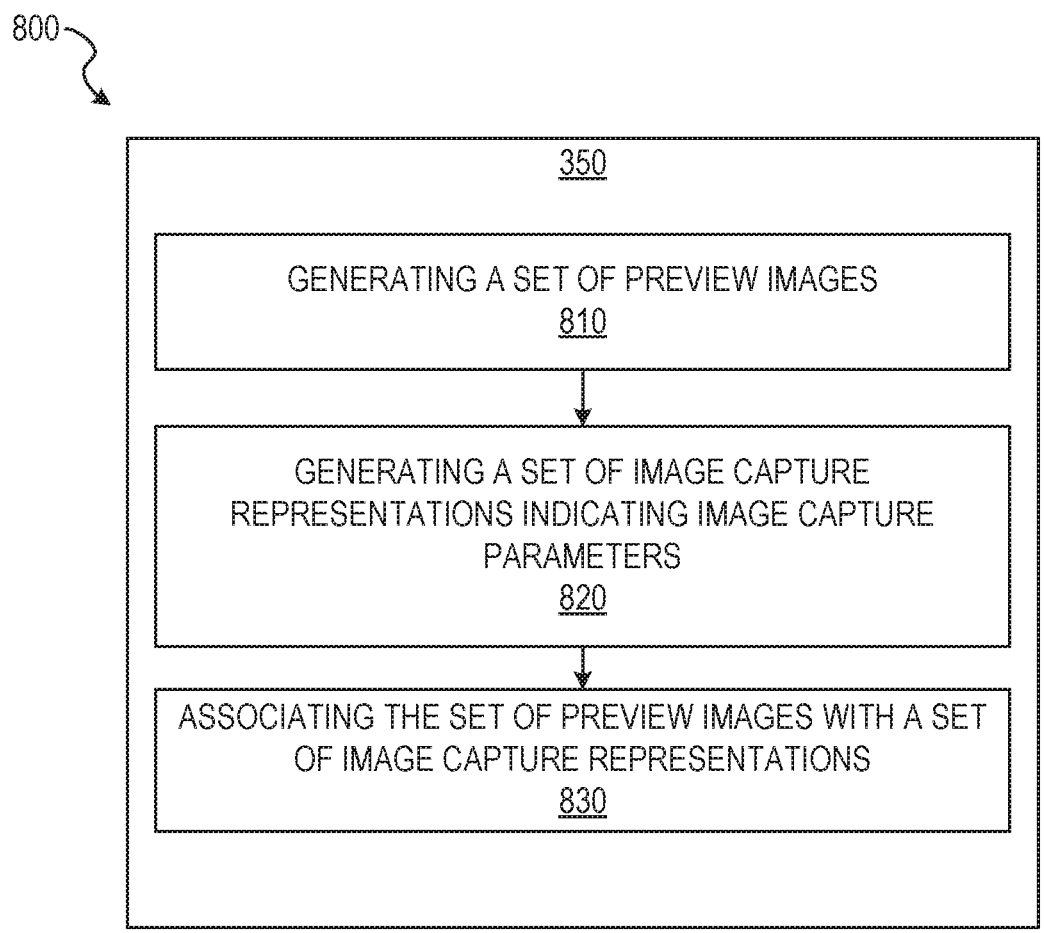
FIG. 8 is a flow chart illustrating an example method, according to various embodiments.

FIG. 8 is a flow chart of operations of a method 800 of the image modification system 150 in performing the operation 350 for modifying image capture device settings to generate accurate images, according to various example embodiments of the present disclosure. The method 800, depicted in FIG. 8, may be performed by the image modification system 150, using components described above with respect to FIG. 2.

Figure 9:
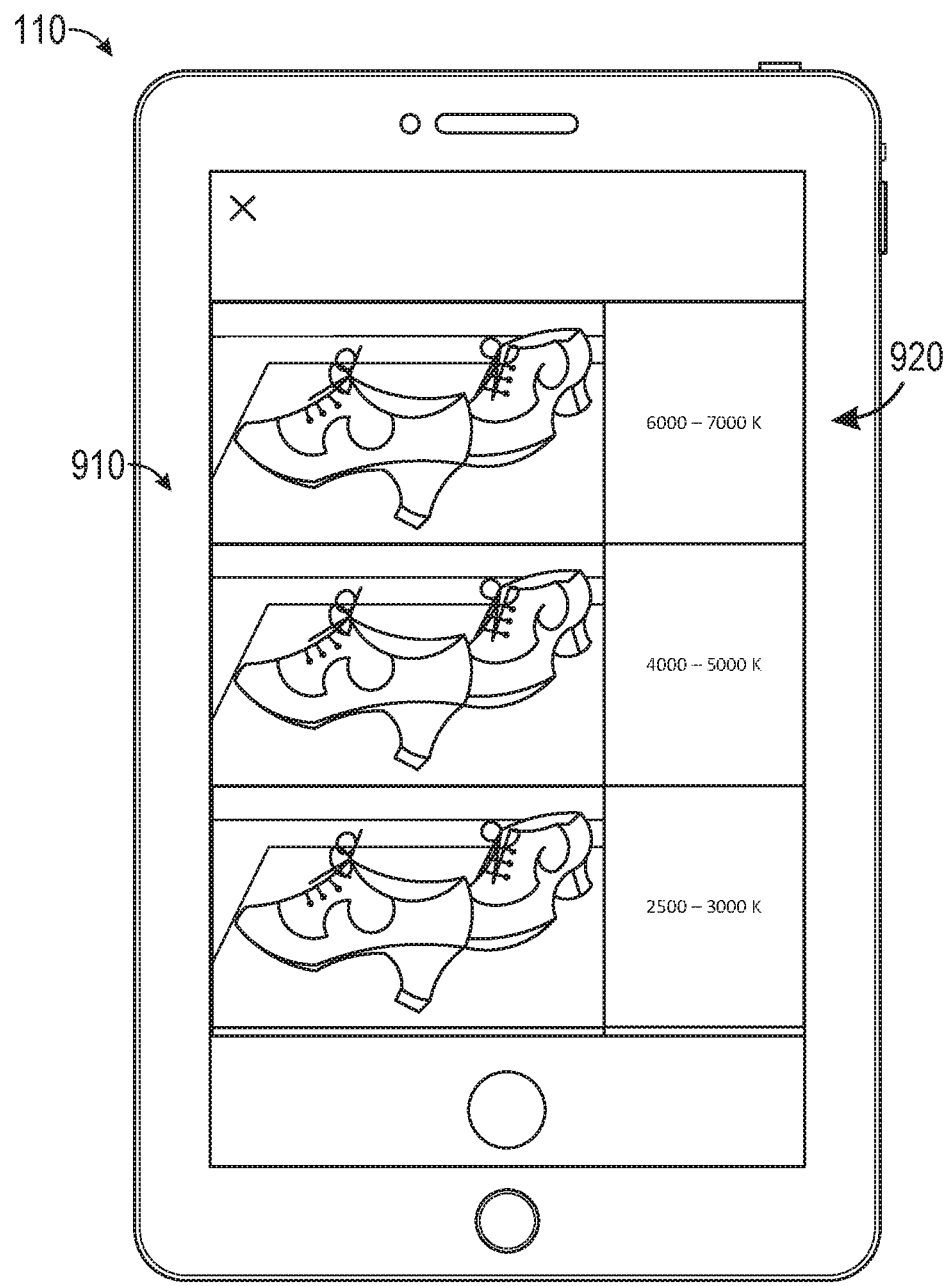
FIG. 9 is an example user interface diagram illustrating a set of preview images, according to various embodiments.

In operation 810, the notification component 250 generates a set of preview images. As shown in FIG. 9, the set of preview images 910 may be generated with differing parameter values and presented proximate to one another. Each preview image of the set of preview images may be generated with a different image capture parameter of the set of image capture parameters. In some instances, the set of preview images may be positioned in an ordered manner based on the image capture parameters. For example, in some instances, the notification component 250 may generate six preview images in a grid pattern having three columns and two rows of images. The notification component 250 may arrange the set of preview images such that an image in a first column and a first row has a white balance value (e.g., an image capture parameter) having the lowest value. Each image may have a progressively higher white balance value (e.g., image capture parameter) such that the preview image positioned in the third column of the second row has the highest value for the white balance (e.g., image capture parameter).

In operation 820, the notification component 250 generates a set of image capture representations indicating image capture parameters of the set of image capture parameters. As shown in FIG. 9, the set of image capture representations 920 may be presented proximate to a preview image generated using the image capture parameter. The image capture representations may be a set of numbers indicating a single image capture parameter or a plurality of image capture values. For example, the set of image capture representations may be a numerical value for the white balance used in generating the preview image. The image capture representations may also be a set of sliders, a set of wheels or dials, or any other suitable representation. In some embodiments, one or more of the set of image capture representations may be overlaid on the preview image to which the image capture representation or representations correspond. In these embodiments, the image capture representation may be positioned on the preview image in a position such that the object of interest remains unobstructed. In some instances, the image capture representations may be positioned in a separate portion of a notification represented by a differing portion of a display device.

In operation 830, the notification component 250 associates the set of preview images with the set of image capture representations, with each preview image including an image capture representation indicating the image capture parameter used to generate the preview image. The association of a preview image with an image capture representation or set of image capture representations may cause the notification component 250 to present the image capture representation proximate to or within a border of the preview image with which it is associated.

Figure 10:
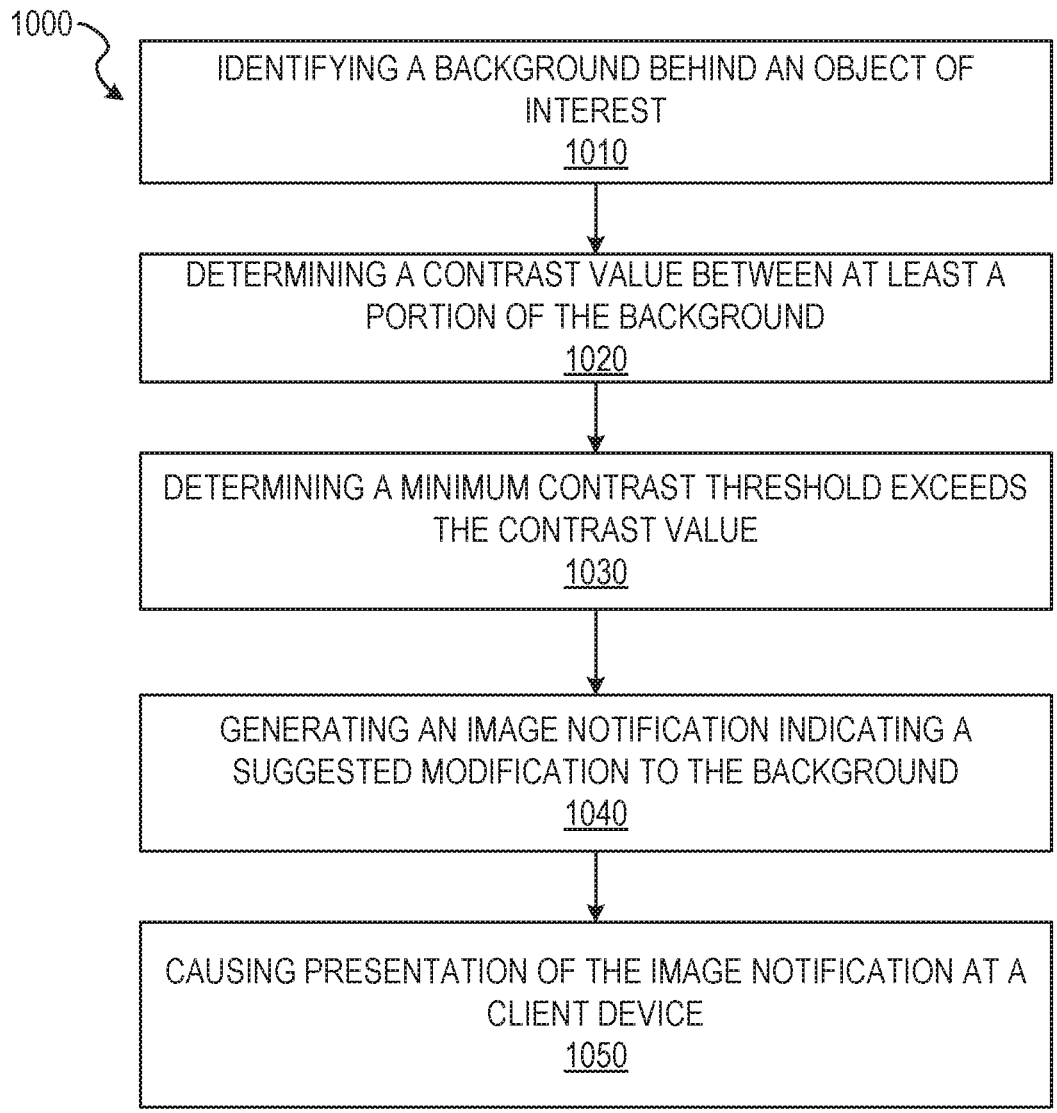
FIG. 10 is a flow chart illustrating an example method, according to various embodiments.

FIG. 10 is a flow chart of operations of the image modification system 150 in performing a method 1000 of identifying and generating a set of modified images for publication on a network-based publication system, according to some example embodiments. The operations depicted in FIG. 10) may be performed by the image modification system 150, using components described above with respect to FIG. 2. In some instances, as shown in FIG. 10, the method 1000 may be performed as a part of the methods 300 or 700 or may be performed as a set of sub-operations of one or more of the operations described in the methods 300 and 700.

In operation 1010, the identification component 230 identifies a background behind the object of interest. In some instances, the operation 1010 may be performed after one or more of the operation 330 or 340, where the object of interest and the object characteristics have been identified. The background may be identified as a portion of the field of view which surrounds the object of interest, in whole or in part. The identification component 230 may identify the background using edge detection operations, shape detection operations, color identification operations, or any other recognition operations suitable to identify the background.

In operation 1020, the parameter component 220 determines a contrast value between at least a portion of the object of interest and at least a portion of the background. In some embodiments, the parameter component 220 determines one or more of a hue, a tint, a saturation, and a luminance value for each of the background and the object of interest. The parameter component 220 then determines a contrast value between the object of interest and the background. The contrast value may be a numerical or graphical representation of the contrast between colors or other values of the object of interest and the background.

In operation 1030, the parameter component 220 determines that a minimum contrast threshold exceeds the contrast value. For example, the contrast value may be below the minimum contrast threshold. The minimum contrast threshold may represent a numerical or graphical value at which colors or other values of the object of interest become indistinguishable or otherwise unsuitable with respect to the background or other values of the object of interest. The parameter component 220 may determine that the minimum contrast threshold exceeds the contrast value by comparing values (e.g., numerical or graphical) of the contrast value and the minimum contrast threshold. In some instances, the parameter component 220 may perform one or more image analysis techniques (e.g., edge detection, shape detection, or color detection) to determine whether the minimum contrast threshold exceeds the contrast value. For example, where the minimum contrast threshold exceeds the contrast value, one or more edges of the object of interest may not be distinguishable within the field of view or a captured image.

In operation 1040, the notification component 250 generates an image notification indicating a suggested modification to the background behind the object of interest. Operation 1040 may be performed in response to the parameter component 220 determining the contrast value is below the minimum contrast threshold. In some instances, the suggested modification may indicate a change in one or more image capture parameters. The suggested modification may indicate a change in the background. For example, the notification component 250 may generate text instructing the user to replace the current background with a differing background.

In some embodiments, the operation 1040 may comprise a set of sub-operations. In some instances, in performing the operation 1040, the identification component 230 identifies a color of the background. The color may be identified by a color value for pixels of the background, a hue value, a saturation value, a luminance value, combinations thereof, or any other suitable value. In some instances the identification component 230 identifies the color of the background by parsing pixels, of the field of view or the captured image, associated with the background and extracting color values of the pixels.

The identification component 230 may then identify an alternate color. The alternate color may have a contrast value in relation to the object of interest which exceeds the minimum contrast threshold. For example, where the object of interest is primarily dark blue and the background is black, dark brown, or dark blue, the identification component 230 may identify yellow, light gray, beige, or another suitable alternate color having a higher contrast with the object of interest. In some instances, the identification component 230 may determine a plurality of colors for the object of interest and identify the alternate color such that differentiation among the plurality of colors and between the plurality of colors and the background has a suitable contrast value.

The notification component 250 may then generate an indication of the alternate color as the suggested modification to the background. The notification component 250 may generate text suggesting that a background of the alternate color be positioned under or behind the object of interest. In some embodiments, in addition to the text, the notification component 250 may generate one or more color block (e.g., rectangular, oblong, square, or circular) with user interface elements matching the alternate color or a set of alternate colors to enable visual confirmation of an alternate color corresponding to the suggestion.

In operation 1050, the presentation component 260 causes presentation of the image notification at the image capture device. The presentation component 260 may cause presentation by rendering the notification as a window (e.g., a pop up or overlay) over the captured image, the preview image, or the field of view of the image capture device represented on the display device. In some instances, the presentation component 260 may transmit data representing the image notification to a client device for rendering on the display device for the user.

Figure 11:
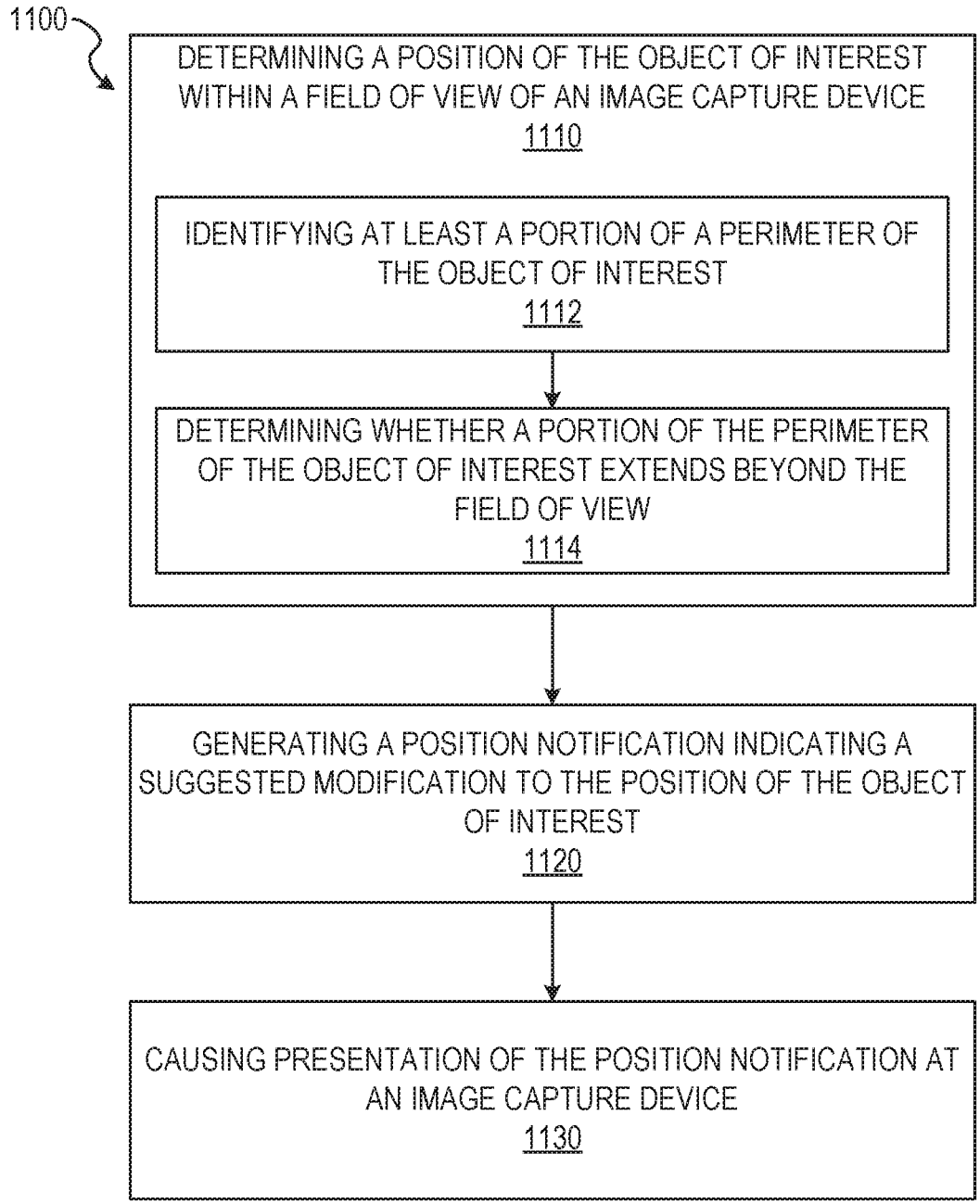
FIG. 11 is a flow chart illustrating an example method, according to various embodiments.

FIG. 11 is a flow chart of operations of the image modification system 150 in performing operations of a method 1100 of identifying and generating a set of modified images for a publication on the publication system 142, according to various example embodiments. Shown in FIG. 11 is a set of operations which may be performed as part of the method 300 or 700 or as a set of sub-operations of one or more of the operations described in the method 300 or 700.

In operation 1110, the identification component 230 determines a position of the object of interest within the field of view of the image capture device. In some instances, the identification component 230 determines the position of the object of interest as a position within the field of view of the image capture device. The identification component 230 may determine the position of the object of interest based on a distance of one or more portions of the object of interest from one or more edges of the field of view. For example, the position may be determined by calculating a pixel distance or other distance from one or more edges (e.g., the one or more portions of the object of interest) to the one or more edges of the field of view. The identification component 230 may determine the position based on one or more pixels representing the object of interest. The identification component 230 may also determine the position based on a grid determined for the field of view. For example, the identification component 230 may partition the field of view of the image capture device into a set of boxes in a grid pattern. The position of the object of interest may be determined as one or more specified boxes in which pixels representing the object of interest are located.

In some embodiments, the identification component 230 may perform the operation 1110 using one or more sub-operations. In some instances, in operation 1112, the identification component 230 identifies at least a portion of a perimeter of the object of interest within the field of view of the image capture device. The identification component 230 may perform one or more object recognition operations to identify the portion of the perimeter. In some embodiments, the identification component 230 determines a position of the object of interest (e.g., a position of the perimeter) using edge matching techniques (e.g., edge detection, Canny edge detection), grayscale matching, gradient matching, interpretation trees, pose consistency, pose clustering, invariance, geometric hashing, scale-invariant feature transform, speed up robust features, or genetic algorithms. In some instances, the identification component 230 determines edges or other features of the object of interest and identifies the position within the field of view of the image capture device. Edges of the object of interest identified by the identification component 230 may form the perimeter or portion of the perimeter of the object of interest.

In operation 1114, the identification component 230 determines whether a portion of the perimeter of the object of interest extends beyond the field of view of the image capture device. Once the object of interest is identified, the identification component 230 may determine the position of the object of interest as described above. For each of the edges of the object of interest, the identification component 230 determines whether a portion of the edge intersects an edge of the field of view. Where an edge of the object of interest intersects an edge of the field of view, the identification component 230 identifies the edge as extending beyond the field of view. After determining that the perimeter of the object of interest extends beyond the field of view, the identification component 230 determines the position of the object of interest, as described above. In some instances, based on the edges of the object of interest and the portion of the perimeter extending beyond the field of view, the identification component 230 determines that a portion of the object of interest is outside of the field of view.

Figure 12:
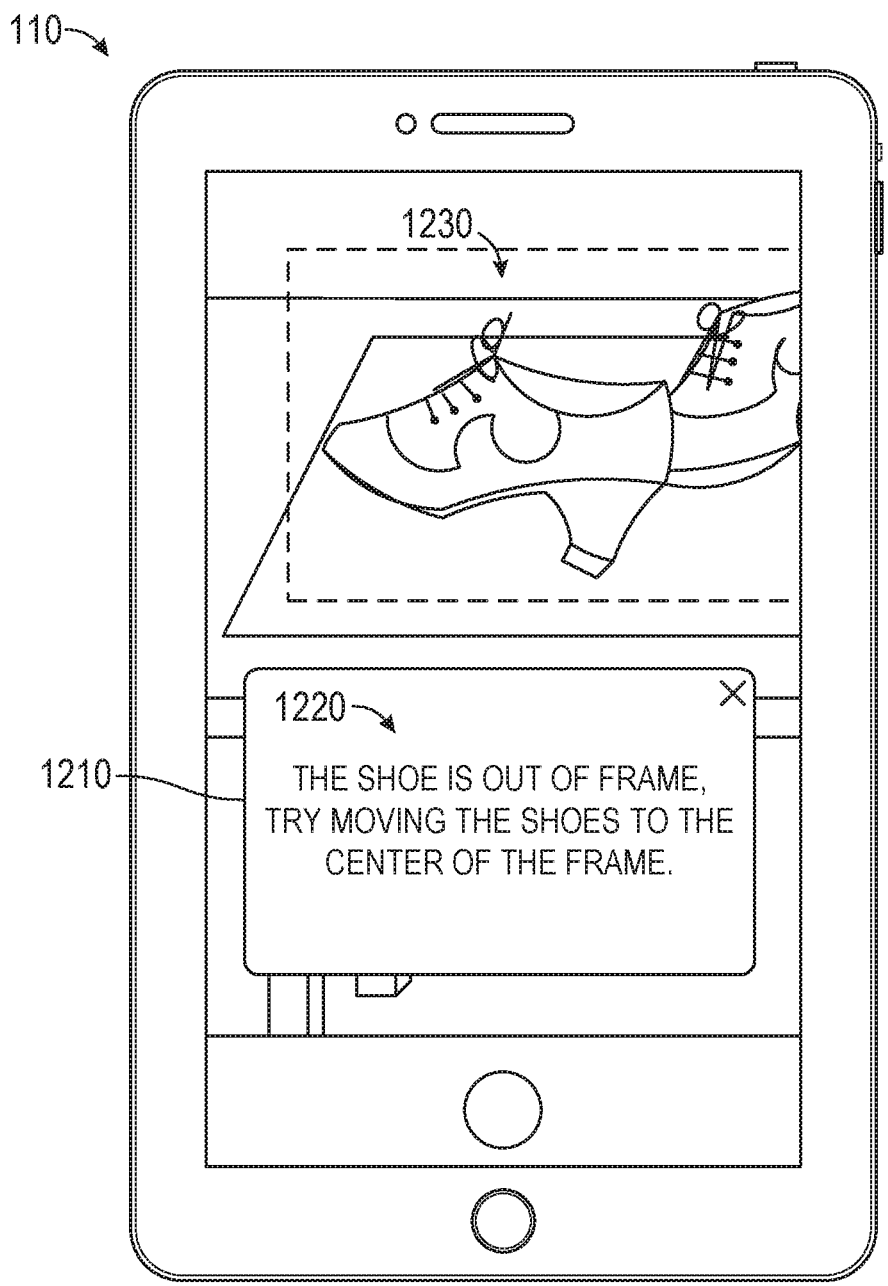
FIG. 12 is an example user interface diagram illustrating a position notification, according to various embodiments.

In operation 1120, the notification component 250 generates a position notification indicating a suggested modification to the position of the object of interest within the field of view of the image capture device. As shown in FIG. 12, the position notification 1210 may be generated with instructions 1220 suggesting a modification of the position of the object of interest 1230. The position notification includes one or more user interface elements indicating a suggested position of the object of interest. The notification component 250 may generate a user interface element such as a dialog box, a window, or a text overlay. The user interface element may include a textual or graphical representation indicating that a portion of the object of interest is outside of the field of view. In some embodiments, the user interface element includes a movement direction for the object of interest, indicating a direction in which the object of interest or the image capture device should be moved to position the object of interest within the field of view of the image capture device. The movement direction may be a relative direction in terms of the image capture device (e.g., right, left, up, or down). In some instances, where portions of the perimeter of the object of interest extend out of the field of view at more than one edge of the field of view, the movement direction may indicate a zoom direction (e.g., zoom out) or relative direction of the image capture device (e.g., move back) sufficient to decrease the apparent size of the object of interest to orient the perimeter of the object of interest within the field of view of the image capture device.

In some embodiments, the position notification includes a graphical indication of the perimeter or a portion of the perimeter. The position notification may also include a graphical indication of a portion of the edge of the field of view intersecting the edge of the object of interest. For example, the position notification may include a highlighted outline of the perimeter of the object of interest and a highlighted portion of the edge of the field of view intersected by the perimeter of the object of interest.

In operation 1130, the presentation component 260 causes presentation of the position notification at the image capture device. The presentation component 260 may cause presentation of the position notification by rendering the position notification on a display device (e.g., an output device, a screen, or a touch screen) of the image capture device, associated with the image capture device, or in communication with the image capture device. For example, where the image capture device is a mobile computing device, such as a mobile telephone, the presentation component 260 may render the position notification on a touch screen of the mobile computing device. In some instances, the position notification is rendered on the display device in combination with a representation of the field of view (e.g., a preview image or a cached image). The position notification may be presented as an overlay depicted on the representation of the field of view, such as an overlay or window.

Figure 13:
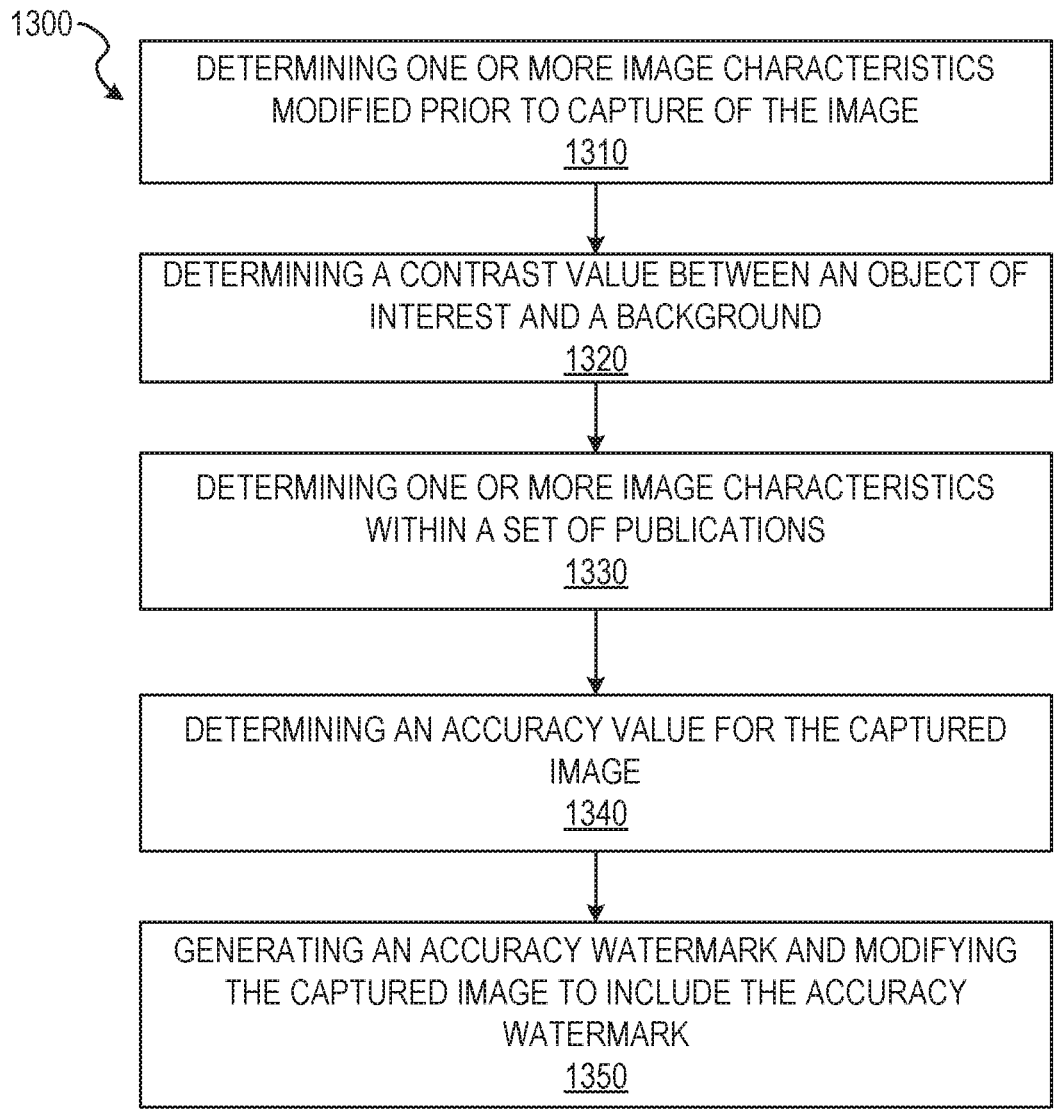
FIG. 13 is a flow chart illustrating an example method, according to various embodiments.

FIG. 13 is a flow chart of operations of the image modification system 150 in performing a method 1300 of modifying publications within the publication system 142, according to some example embodiments. Operations of the method 1300 may be performed by the image modification system 150, using components described above with respect to FIG. 2.

In operation 1310, in response to capturing the image, the authentication component 290 determines one or more image characteristics modified prior to capture of the image. The image characteristics may be a contrast, a color temperature, or any other suitable image characteristic. The image characteristics may be modified based on the characteristics of the object of interest and may have been modified based on a notification generated by the image modification system 150, as described above.

In operation 1320, the authentication component 290 determines a contrast value between the object of interest and the background depicted within the image. The contrast value may be determined as described with respect to the operation 340. In some instances, the contrast value may be an image characteristic modified by the image modification system 150.

In operation 1330, the authentication component 290 determines one or more image characteristics of images within a set of publications on the publication system 142. In some instances, where the image modification system 150 modifies captured images or image characteristics based on a publication associated with the object of interest, the authentication component 290 identifies the set of publications stored on the database 126 of the publication system 142. The authentication component 290 may identify the set of publications based on a search of the database 126, generated from keywords associated with the object of interest and contained in the publication, stored on the image capture device, or otherwise associated with the object of interest. The set of publications identified by the authentication component 290 may be publications which depict and describe objects of interest similar to the object of interest in the captured image modified by the image modification system 150.

The authentication component 290 determines the one or more image characteristics by parsing data and metadata for the images contained in the identified set of publications. The one or more image characteristics may be included within the images or within metadata describing the images. For example, the authentication component 290 may determine the one or more image characteristics as a color temperature and a contrast value between an object of interest depicted within an image and a background positioned behind the object of interest. The contrast value may be determined based on pixel values for the object of interest in the image and the background, and the color temperature may be included within image metadata.

In operation 1340, the authentication component 290 determines an accuracy value for the captured image. The accuracy value may be determined based on the one or more image characteristics of the images contained within the set of publications identified by the authentication component 290. For example, where each publication of the set of publications contains a color temperature and a contrast value between the background and an object of interest, the authentication component 290 may determine an average color temperature value for the color temperatures of the set of publications and an average contrast value for the contrast values of the set of publications. The accuracy value may be a difference between the one or more image characteristics of the captured image and the averaged one or more image characteristics of the set of publications. For example, the authentication component 290 may determine a color temperature difference between the average color temperature value and the color temperature of the captured image and a contrast difference between the average contrast value and the contrast value for the captured image. In these instances, where the accuracy value is lower, the one or more image characteristics of the captured image are similar to the one or more image characteristics of the set of publications. Although an example has been described in which a lower value indicates accuracy, it should be understood that the accuracy value may be calculated in a manner that yields a higher value for comparatively more accurate image characteristics.

In operation 1350, based on the accuracy value, the authentication component 290 generates an accuracy watermark and modifies the captured image to include the accuracy watermark. The authentication component 290 may generate the accuracy watermark where the accuracy value exceeds an accuracy threshold. In some instances, the accuracy threshold may be a predetermined accuracy value below which the one or more image characteristics of the captured image are accurate with respect to the set of publications. In these instances, exceeding the accuracy threshold indicates that the accuracy value is lower than the accuracy threshold. In embodiments where a higher accuracy value indicates a more accurate captured image, exceeding the accuracy threshold may occur where the accuracy value is greater than the accuracy threshold. The accuracy watermark may be a visible graphical representation generated and incorporated into the captured image, generating a modified captured image. In some instances, the accuracy watermark may be generated as metadata associated with the captured image. Where the accuracy watermark is metadata, the accuracy watermark may be included in preexisting metadata describing the captured image, or generated as separate metadata to be associated with the captured image. Inclusion of the accuracy watermark depicted within a captured image or stored in metadata associated with a captured image, may indicate that the settings and parameters with which the image was captured generate a captured image which is an accurate representation of the characteristics (e.g., size, colors, and color temperatures) of the object of interest within the captured image. In this way, the accuracy watermark may indicate to an observer that the object of interest is accurately portrayed in the captured image as it would appear in person. The accuracy watermark may also indicate that no image filters were used in generating the captured image which would cause the object of interest to appear differently in the captured image than in person.

According to various example embodiments, one or more of the methodologies described herein may facilitate modifying image capture modes and image capture parameters to generate accurate images based on identified objects of interest within a field of view of an image capture device. One or more methodologies described herein may also generate and cause presentation of instructions or suggestions to guide a user in modifying image capture modes, image capture parameters, or image composition elements to generate accurate images based on the identified objects. Methodologies described herein may also facilitate modification, automatically or manually, of the image capture modes, image capture parameters, and image composition based on similarities to images included in network-based publications having a determined qualitative and quantitative value. Accordingly, one or more of the methodologies described herein may have the effect of allowing a user to generate quality, accurate images which are supported by an objective accuracy assessment for use in online publications and other transmission or publication.

As a result, one or more of the methodologies described herein may reduce or eliminate a need for certain efforts or resources that otherwise would be involved in determining and setting image capture modes, image capture parameters, and image composition to generate accurate depictions of objects within an image. Efforts expended by a user in identifying and replicating accurate images based on network-based publications are reduced, and accuracy may be more quantitatively determined based on the image parameters not presented to the user (e.g., stored in metadata or hidden from the user) when viewing network-based publications. Examples of computing resources which may be reduced by the presented methodologies of the present disclosure include processor cycles, network traffic, memory usage, data storage capacity, power consumption, and cooling capacity. Specifically, computing resources used by machines, being directed by interactions of a user, to search for network-based publications and images or to recapture inaccurate images may be reduced or eliminated.

Modules, Components, and Logic

Certain embodiments are described herein as including logic or a number of components, modules, or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Machine and Software Architecture

The components, methods, applications, and so forth described in conjunction with FIGS. 2-13 are implemented in some embodiments in the context of a machine and an associated software architecture. In various embodiments, the components, methods, applications, and so forth described above are implemented in the context of a plurality of machines, distributed across and communicating via a network, and one or more associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 14:
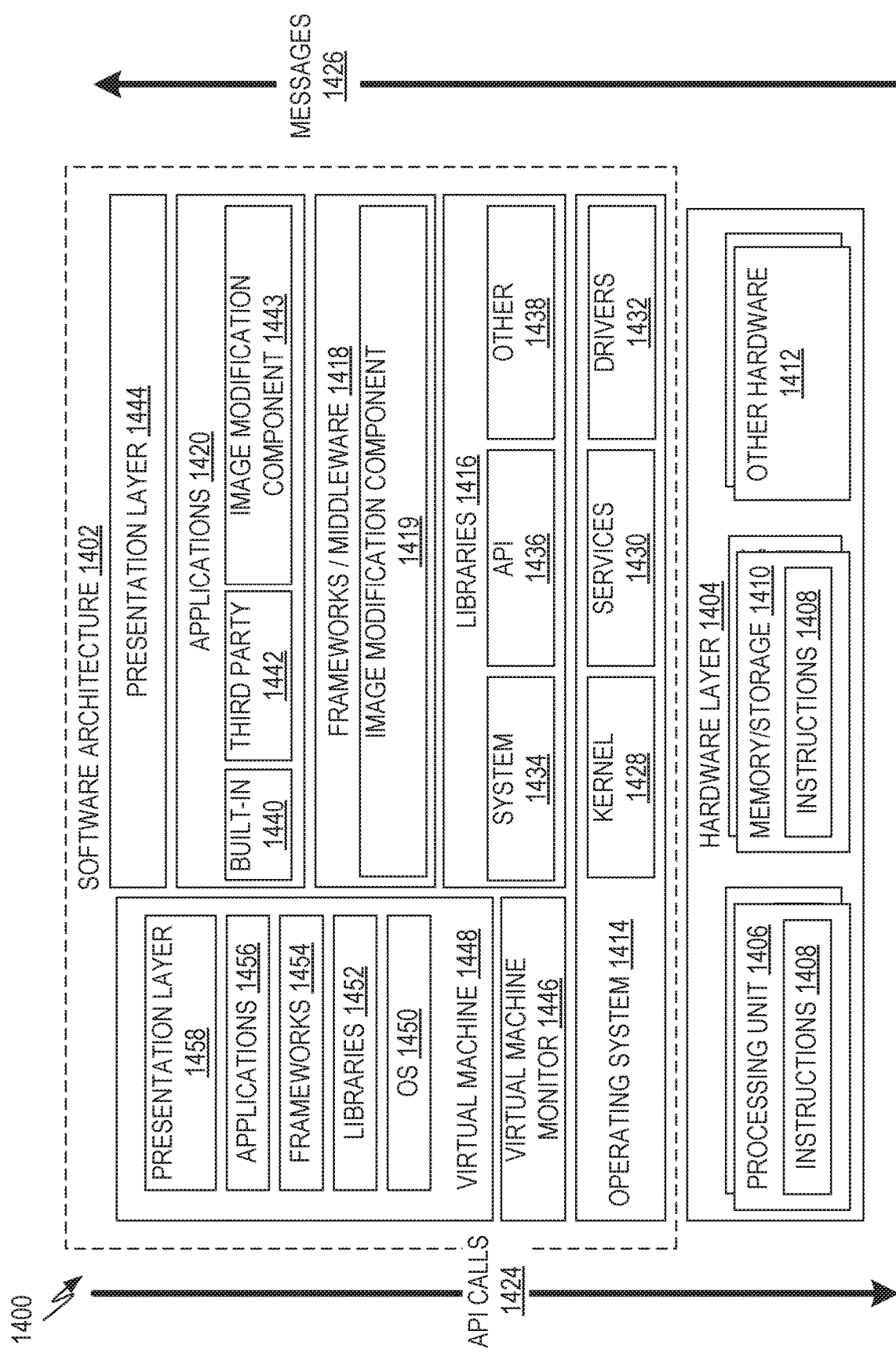
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture, and it will be appreciated that many other architectures may be implemented to facilitate the functionality described herein. The software architecture 1402 may be executing on hardware such as a machine 1500 of FIG. 15 that includes, among other things, processors 1510, memory/storage 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. The executable instructions 1408 represent the executable instructions of the software architecture 1402, including implementation of the methods, components, and so forth of FIGS. 2-13. The hardware layer 1404 also includes memory and/or storage components 1410, which also have the executable instructions 1408. The hardware layer 1404 may also comprise other hardware 1412 which represents any other hardware of the hardware layer 1404, such as the other hardware illustrated as part of the machine 1500.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and a presentation layer 1444. Operationally, the applications 1420 and/or other components within the layers may invoke application programming interface (API) calls 1424 through the software stack and receive a response, returned values, and so forth illustrated as messages 1426 in response to the API calls 1424. The layers illustrated are representative in nature, and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth®® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software components to perform tasks in an easier fashion than to interface directly with the underlying operating system 1414 functionality (e.g., kernel 1428, services 1430, and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 and/or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform. In some example embodiments, image modification components 1419 (e.g., one or more components of the image modification system 150) may be implemented at least in part within the middleware/frameworks 1418. For example, in some instances, at least a portion of the presentation component 260, providing graphic and non-graphic user interface functions, may be implemented in the middleware/frameworks 1418. Similarly, in some example embodiments, portions of one or more of the receiver component 210, the parameter component 220, the identification component 230, and the characteristic component 240 may be implemented in the middleware/frameworks 1418.

The applications 1420 include built-in applications 1440, third party applications 1442, and/or image modification components 1443 (e.g., user facing portions of one or more of the components of the image modification system 150). Examples of representative built-in applications 1440 may include, but are not limited to, a contacts application, a browser application, a book reader application, a location application, a media application, a messaging application, and/or a game application. The third party applications 1442 may include any of the built-in applications as well as a broad assortment of other applications. In a specific example, the third party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1442 may invoke the API calls 1424 provided by the mobile operating system such as the operating system 1414 to facilitate functionality described herein. In various example embodiments, the user facing portions of the image modification components 1443 may include one or more components or portions of components described with respect to FIG. 2. For example, in some instances, portions of the receiver component 210, the parameter component 220, the identification component 230, the notification component 250, and the presentation component 260 associated with user interface elements (e.g., data entry and data output functions) may be implemented in the form of an application of the image modification components 1443.

The applications 1420 may utilize built-in operating system functions (e.g., kernel 1428, services 1430, and/or drivers 1432), libraries (e.g., system libraries 1434, API libraries 1436, and other libraries 1438), and frameworks/middleware 1418 to create user interfaces to interact with users of the system. Alternatively, or additionally, in some systems interactions with a user may occur through a presentation layer, such as the presentation layer 1444. In these systems, the application/module "logic" can be separated from the aspects of the application/module that interact with a user.

Some software architectures utilize virtual machines. In the example of FIG. 14, this is illustrated by a virtual machine 1448. A virtual machine creates a software environment where applications/modules can execute as if they were executing on a hardware machine (such as the machine 1500 of FIG. 15, for example). A virtual machine is hosted by a host operating system (e.g., operating system 1414 in FIG. 14) and typically, although not always, has a virtual machine monitor 1446, which manages the operation of the virtual machine as well as the interface with the host operating system (e.g., operating system 1414). A software architecture executes within the virtual machine 1448 such as an operating system 1450, libraries 1452, frameworks/middleware 1454, applications 1456, and/or a presentation layer 1458. These layers of software architecture executing within the virtual machine 1448 can be the same as corresponding layers previously described or may be different.

Example Machine Architecture and Machine-Readable Medium

Figure 15:
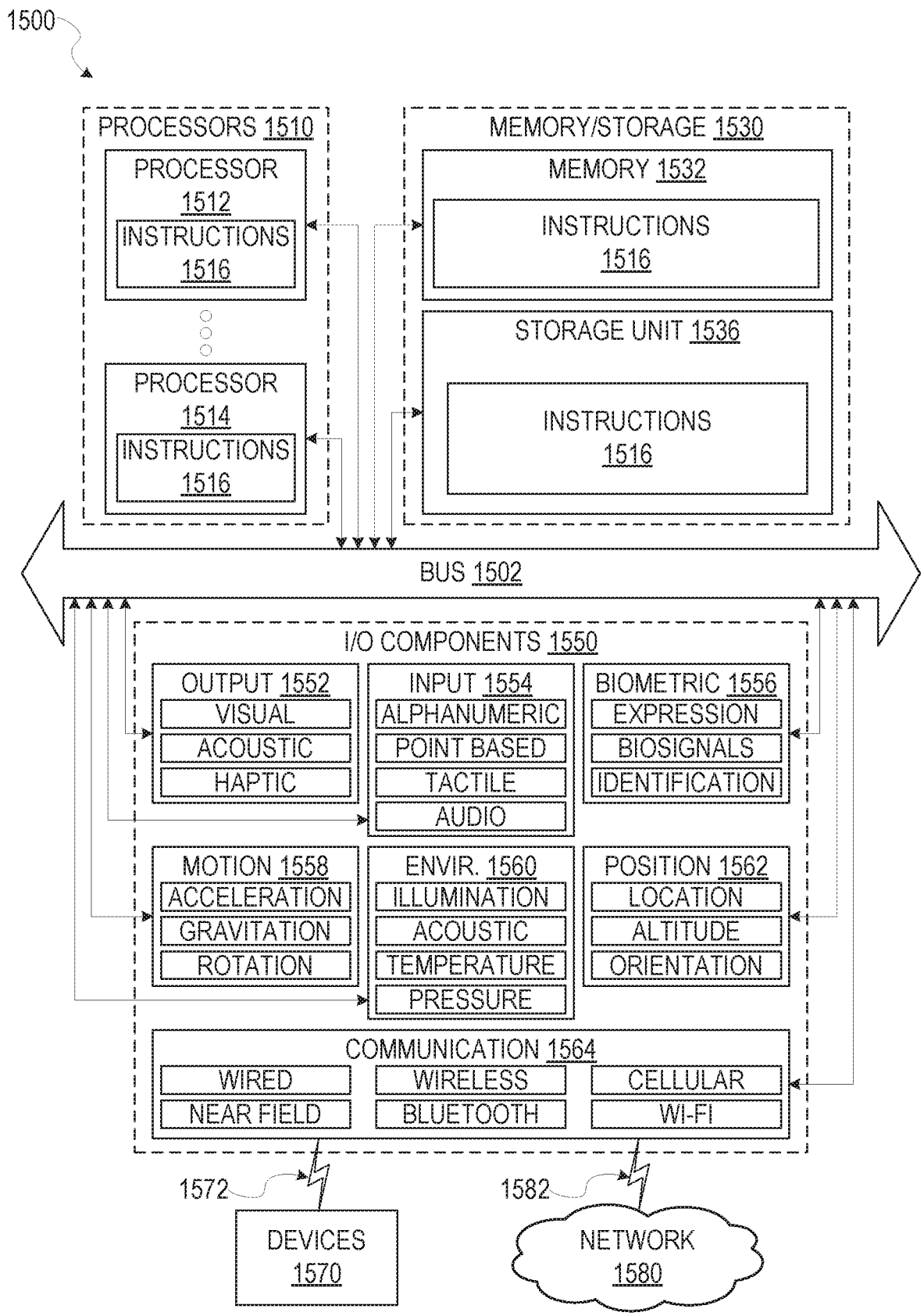
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions (e.g., processor executable instructions) from a machine-readable medium (e.g., a non-transitory machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute the flow diagrams of FIGS. 3, 7-8, 10-11, and 13. Additionally, or alternatively, the instructions 1516 may implement the receiver component 210, the parameter component 220, the identification component 230, the characteristic component 240, the notification component 250, and the presentation component 260 of FIGS. 2-13, and so forth. The instructions 1516 transform the general, non-programmed machine into a particular machine programmed to carry out the described and illustrated functions in the manner described.

In alternative embodiments, the machine 1500 operates as a standalone device or may be coupled (e.g., networked) to other machines in a networked system. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), an entertainment media system, a web appliance, a network router, a network switch, a network bridge, or any machine capable of executing the instructions 1516, sequentially or otherwise, that specify actions to be taken by the machine 1500. In some example embodiments, in the networked deployment, one or more machines may implement at least a portion of the components described above. The one or more machines interacting with the machine 1500 may comprise, but not be limited to, a personal digital assistant (PDA), an entertainment media system, a cellular telephone, a smartphone, a mobile device, a wearable device (e.g., a smart watch), a smart home device (e.g., a smart appliance), and other smart devices. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (WIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572 respectively. For example, the communication components 1564 may include a network interface component or other suitable device to interface with the network 1580. In further examples, the communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NEC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method performed by hardware processing circuitry of an image capture device, comprising:
   capturing an image using an image sensor, the capturing based on a first image capture parameter, the first image capture parameter defining a setting of the image capture device;
   identifying a first object of interest in the captured image, the identification of the first object of interest based on an object recognition operation;
   identifying an image characteristic of the first object of interest, the identification of the image characteristic based on an object characteristic value of the captured image;
   determining, by the hardware processing circuitry and based on the imaghe characteristic and the first image capture parameter, a modification of the first image capture parameter, the modification causing the image characteristic to change within the image;
   generating a prompt to confirm the modification determined by the hardware processing circuitry of the first image capture parameter, the prompt further indicating a range for the modification and a user interface element selectable to modify the first image capture parameter; and
   causing presentation, at the image capture device, of the prompt.

2. The method of claim 1, further comprising identifying a second object of interest in the captured image responsive to identifying a second set of object characteristics of the second object of interest.

3. The method of claim 1, further comprising identifying a type of the first object of interest in the captured image responsive to identifying a third set of object characteristics of the first object of interest.

4. The method of claim 3, wherein the identification of the type of the first object of interest is based on at least one of edge detection object recognition, rigid point detection, and shape recognition.

5. The method of claim 1, generating the prompt further comprises:
   generating a set of preview images, each preview image of the set of preview images generated with a different image capture parameter value;
   generating a set of image capture representations indicating the different image capture parameter values; and
   associating the set of preview images with the set of image capture representations, with each preview image including an image capture representation indicating the image capture parameter value used to generate the preview image.

6. The method of claim 1 further comprising:
   identifying a background behind the object of interest;
   determining a contrast value between at least a portion of the first object of interest and the background;
   determining that a minimum contrast threshold exceeds the contrast value;
   generating an image notification indicating a suggested modification to the background behind the first object of interest;
   causing presentation of the image notification at the image capture device;
   and, wherein the generating the image notification further comprises:
   identifying a color of the background;
   identifying an alternate color, the alternate color having a contrast value in relation to the first object of interest which exceeds the minimum contrast threshold; and
   generating an indication of the alternate color as the suggested modification to the background.

7. The method of claim 1, wherein the image characteristic is a size of the first object of interest, and the method further comprising:
   determining a position of the first object of interest within the captured image;
   generating a position notification indicating a suggested modification to the position of the first object of interest, the position notification including one or more user interface elements indicating a suggested position of the first object of interest;
   causing presentation of the position notification at the image capture device;
   and wherein the determining the position of the first object of interest further comprises:
   identifying at least a first portion of a perimeter of the first object of interest within the captured image; and
   determining whether a portion of the perimeter of the captured image extends beyond a field of view of the image capture device.

8. The method of claim 1 further comprising:
   determining dimensions of the captured image; and in response to determining that the dimensions of the captured image exceed a predetermined dimension threshold, modifying the dimensions of the captured image to be within the predetermined dimension threshold and generating a modified image.

9. The method of claim 1, wherein the identifying of the image characteristics of the first object of interest further comprises:
   accessing a publication within the image capture device;
   parsing a publication to identify a text description associated with first object of interest;
   identifying the image characteristic from the text description within the publication and, wherein generating the prompt further comprises:
   accessing a set of publications within a publication system;
   identifying a set of image parameters for images within the set of publications; and
   determining one or more of the image parameters to include in the prompt.

10. A device, comprising:
    one or more hardware processors; and
    a non-transitory processor-readable storage medium storing processor-executable instructions that, when executed by the one or more hardware processors, cause operations comprising:
    capturing an image using an image sensor, the capturing based on a first image capture parameteer, the first image capture parameter defining a setting of the device;
    identifying a first object of interest in the captured image, the identificaiton of the first object of interest based on an object recognition operation;
    identifying an image characteristic of the first object of interest, the identification of the image characteristic based on an object characteristic value of the captured image;
    determining, based on the image characteristic and the first image capture parameter, a modification of the first image capture parameter, the modification causing the image characteristic to change within the image;
    generating a prompt to confirm the modification of the first image capture parameter, the prompt further indicating a range for the modification and a user interface element selectable to modify the first image capture parameter; and
    causing presentation, at the device, of the prompt.

11. The device of claim 10, further comprising identifying a second object of interest in the captured image responsive to identifying a set of object characteristics of the second object of interest.

12. The device of claim 10, wherein the first image capture parameter is one of a set of image capture parameters and generating the prompt further comprises:
    generating a set of preview images, each preview image of the set of preview images generated with a different image capture parameter of the set of image capture parameters;
    generating a set of image capture representations indicating image capture parameters of the set of image capture parameters; and
    associating the set of preview images with the set of image capture representations, with each preview image including an image capture representation indicating the image capture parameter used to generate the preview image.

13. The device of claim 10, wherein the image characteristic is a size of the first object of interest, and wherein the operations further comprise:
    determining a position of the first object of interest within the captured image;
    generating a position notification indicating a suggested modification to the position of the first object of interest, the position notification including one or more user interface elements indicating a suggested position of the first object of interest;
    causing presentation of the position notification at the device, and wherein the determining the position of the first object of interest further comprises:
    identifying at least a first portion of a perimeter of the first object of interest within the captured image; and
    determining whether a portion of the perimeter of the first object of interest extends beyond the field of the device.

14. The device of claim 10, wherein the operations further comprise:
    determining dimensions of the captured image; and
    in response to determining that the dimensions of the captured image exceed a predetermined dimension threshold, modifying the dimensions of the captured image to be within the predetermined dimension threshold and generating a modified image.

15. The device of claim 10, wherein identifying the image characteristics further comprises:
    accessing a publication within the device;
    parsing the publication to identify a text description associated with the first object of interest; and
    identifying the image characteristic from the text description within the publication.

16. The device of claim 10, wherein generating the prompt further comprises:
    accessing a set of publications within a publication system;
    identifying a set of image parameters for images within the set of publications; and
    determining one or more of the image parameters in the prompt.

17. A non-transitory processor-readable storage medium comprising processor-executable instructions that, when executed by a processor of a machine, cause the machine to perform operations comprising:
    capturing an image using an image sensor, the capturing based on a first image capture parameter, the first image capture parameter defining a setting of an image capture device;
    identifying a first object of interest in the captured image, the identification of the first object of interest based on an object recognition operation;
    identifying an image characteristic of the first object of interest, the identification of the image characteristic based on an object characteristic value of the captured image;
    determining, by the hardware processor and based on the image characteristic and the first image capture parameter, a modification of the first image capture parameter, the modification causing the image characteristic to change within the image;
    generating a prompt to confirm the modification determined by the hardware processor of the first image capture parameter, the prompt further indicating a range for the modification and a user interface element selectable to modify the first image capture parameter; and causing presentation, at the image capture device, of the prompt.

18. The non-transitory processor-readable storage medium of claim 17, further comprising identifying a second object of interest in the field of view of the image capture device responsive to identifying a second set of object characteristics of the second object of interest and using at least two object recognition techniques including using rigid point detection and edge detection object recognition.

19. The non-transitory processor-readable storage medium of claim 17, wherein identifying the image characteristic of the first object of interest further comprises:
   accessing a publication within the image capture device;
   parsing the publication to identify a text description associated with the first object of interest; and
   identifying the image characteristic from the text description within the publication and, wherein generating the parameter notification further comprises:
   accessing a set of publications within a publication system;
   identifying a set of image parameters for images within the set of publications; and
   determining one or more of the image parameters to include in the prompt.

20. The non-transitory processor-readable storage medium of claim 17, wherein the operations further comprise:
   identifying a background behind the first object of interest;
   determining a contrast value between at least a portion of the first object of interest and the background;
   determining that a minimum contrast threshold exceeds the contrast value;
   generating an image notification indicating a suggested modification to the background behind the first object of interest; and
   causing presentation of the image notification at the image capture device.

* * * * *